(12) United States Patent
Grohoski et al.

(10) Patent No.: US 12,306,783 B2
(45) Date of Patent: May 20, 2025

(54) TOP LEVEL NETWORK AND ARRAY LEVEL NETWORK FOR RECONFIGURABLE DATA PROCESSORS

(71) Applicant: SambaNova Systems, Inc., Palo Alto, CA (US)

(72) Inventors: Gregory Frederick Grohoski, Bee Cave, TX (US); Sumti Jairath, Palo Alto, CA (US); Mark Luttrell, Palo Alto, CA (US); Raghu Prabhakar, San Jose, CA (US); Ram Sivaramakrishnan, San Jose, CA (US); Manish K. Shah, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/199,361

(22) Filed: May 18, 2023

(65) Prior Publication Data

US 2023/0289310 A1     Sep. 14, 2023

Related U.S. Application Data

(63) Continuation of application No. 17/589,467, filed on Jan. 31, 2022, now Pat. No. 11,681,645, which is a
(Continued)

(51) Int. Cl.
*G06F 9/455* (2018.01)
*G06F 12/10* (2016.01)
(Continued)

(52) U.S. Cl.
CPC ...... *G06F 13/4027* (2013.01); *G06F 9/45533* (2013.01); *G06F 12/10* (2013.01);
(Continued)

(58) Field of Classification Search
None
See application file for complete search history.

(56) References Cited

U.S. PATENT DOCUMENTS

| 4,769,790 A | 9/1988 | Yamashita |
| 5,560,029 A | 9/1996 | Papadopoulos et al. |

(Continued)

FOREIGN PATENT DOCUMENTS

| CN | 1122026 A | 5/1996 |
| CN | 101485576 A | 7/2009 |

(Continued)

OTHER PUBLICATIONS

PCT/US2020/032186—International Search Report and Written Opinion dated Aug. 14, 2020; 21 pages.
(Continued)

*Primary Examiner* — Michael Sun
(74) *Attorney, Agent, or Firm* — Flagship Patents; Sikander M. Khan; Bruce A. Young

(57) ABSTRACT

A reconfigurable data processor comprises an array of configurable units and a bus system. The bus system is connected to the array of configurable units. The bus system includes a top level network and an array level network. The top level network is connected to an external data interface for communication with memory outside of the array of configurable units. The array level network is connected to configurable units in the array of configurable units.

19 Claims, 22 Drawing Sheets

Related U.S. Application Data continuation of application No. 16/862,445, filed on Apr. 29, 2020, now Pat. No. 11,237,996, which is a continuation of application No. 16/239,252, filed on Jan. 3, 2019, now Pat. No. 10,698,853.

(51) Int. Cl.
*G06F 13/16* (2006.01)
*G06F 13/40* (2006.01)
*G06F 15/78* (2006.01)

(52) U.S. Cl.
CPC ...... *G06F 13/1668* (2013.01); *G06F 15/7839* (2013.01); *G06F 15/7882* (2013.01); *G06F 2212/657* (2013.01)

(56) References Cited

U.S. PATENT DOCUMENTS

| | | | |
|---|---|---|---|
| 5,684,980 A * | 11/1997 | Casselman | G06F 9/30181 712/E9.035 |
| 5,794,033 A | 8/1998 | Aldebert et al. | |
| 5,963,746 A | 10/1999 | Barker et al. | |
| 6,105,119 A | 8/2000 | Kerr et al. | |
| 6,119,181 A | 9/2000 | Vorbach et al. | |
| 6,327,634 B1 * | 12/2001 | Statovici | H03M 7/30 341/63 |
| 6,728,871 B1 | 4/2004 | Vorbach et al. | |
| 7,224,184 B1 * | 5/2007 | Levi | H03K 19/17752 326/38 |
| 7,797,258 B1 | 9/2010 | Bowman et al. | |
| 7,952,387 B1 | 5/2011 | Frazer | |
| 7,996,684 B2 | 8/2011 | Wasson et al. | |
| 8,006,021 B1 | 8/2011 | Li et al. | |
| 8,045,546 B1 | 10/2011 | Bao et al. | |
| 8,261,042 B2 | 9/2012 | Kanstein et al. | |
| 8,321,618 B1 | 11/2012 | Keil et al. | |
| 8,327,187 B1 * | 12/2012 | Metcalf | H04L 49/109 714/10 |
| 8,656,141 B1 | 2/2014 | Agarwal | |
| 9,047,440 B2 | 6/2015 | Vorbach et al. | |
| 9,158,575 B2 | 10/2015 | Smith | |
| 9,201,899 B2 | 12/2015 | Nishimura et al. | |
| 9,325,320 B1 * | 4/2016 | Sullam | H03K 19/177 |
| 9,411,532 B2 | 8/2016 | Vorbach et al. | |
| 9,569,214 B2 | 2/2017 | Govindu et al. | |
| 9,690,747 B2 | 6/2017 | Vorbach et al. | |
| 9,697,318 B2 | 7/2017 | Hutton et al. | |
| 9,875,105 B2 | 1/2018 | Rozas et al. | |
| 9,952,831 B1 | 4/2018 | Ross et al. | |
| 10,037,227 B2 | 7/2018 | Therien et al. | |
| 10,067,911 B2 | 9/2018 | Gholaminejad et al. | |
| 10,419,338 B2 * | 9/2019 | Gray | H04L 49/106 |
| 10,698,853 B1 | 6/2020 | Grohoski et al. | |
| 10,768,899 B2 | 9/2020 | Koeplinger et al. | |
| 10,831,507 B2 | 11/2020 | Shah et al. | |
| 10,886,921 B1 | 1/2021 | Koganti et al. | |
| 10,908,914 B2 | 2/2021 | Vorbach et al. | |
| 11,055,141 B2 | 7/2021 | Prabhakar et al. | |
| 11,615,038 B2 | 3/2023 | Tørudbakken et al. | |
| 2001/0047509 A1 | 11/2001 | Mason et al. | |
| 2002/0004916 A1 | 1/2002 | Marchand et al. | |
| 2004/0049672 A1 | 3/2004 | Nollet et al. | |
| 2004/0114609 A1 | 6/2004 | Swarbrick et al. | |
| 2004/0153608 A1 | 8/2004 | Vorbach et al. | |
| 2005/0091468 A1 | 4/2005 | Morita et al. | |
| 2005/0108503 A1 | 5/2005 | Sandon et al. | |
| 2005/0257012 A1 | 11/2005 | Hughes | |
| 2006/0010306 A1 | 1/2006 | Saito et al. | |
| 2006/0190517 A1 | 8/2006 | Guerrero | |
| 2007/0046326 A1 | 3/2007 | Fujisawa et al. | |
| 2007/0180172 A1 | 8/2007 | Schmidt et al. | |
| 2009/0031089 A1 | 1/2009 | Tuominen | |
| 2009/0113169 A1 | 4/2009 | Yang et al. | |
| 2009/0135739 A1 | 5/2009 | Hoover et al. | |
| 2009/0300262 A1 | 12/2009 | Vorbach | |
| 2010/0161309 A1 | 6/2010 | Chartraire et al. | |
| 2010/0191911 A1 | 7/2010 | Heddes et al. | |
| 2010/0268862 A1 | 10/2010 | Park et al. | |
| 2010/0293304 A1 | 11/2010 | Alexandron et al. | |
| 2011/0264723 A1 | 10/2011 | Yagain | |
| 2012/0126851 A1 | 5/2012 | Kelem et al. | |
| 2012/0131257 A1 | 5/2012 | Rudosky et al. | |
| 2013/0024621 A1 | 1/2013 | Choi et al. | |
| 2013/0227255 A1 | 8/2013 | Kim | |
| 2013/0326190 A1 | 12/2013 | Chung et al. | |
| 2014/0149480 A1 | 5/2014 | Catanzaro et al. | |
| 2014/0237227 A1 | 8/2014 | Aizawa et al. | |
| 2014/0317628 A1 | 10/2014 | Kim | |
| 2014/0331031 A1 | 11/2014 | Suh et al. | |
| 2015/0227490 A1 | 8/2015 | Seo | |
| 2015/0347192 A1 | 12/2015 | Blaine et al. | |
| 2016/0012012 A1 | 1/2016 | Yen et al. | |
| 2016/0055120 A1 | 2/2016 | Vorbach et al. | |
| 2016/0139955 A1 | 5/2016 | Fee et al. | |
| 2016/0188469 A1 | 6/2016 | Nagarajan et al. | |
| 2017/0083313 A1 | 3/2017 | Sankaralingam et al. | |
| 2017/0105130 A1 | 4/2017 | Chen et al. | |
| 2017/0123794 A1 | 5/2017 | Chen et al. | |
| 2017/0161204 A1 | 6/2017 | Roberts et al. | |
| 2017/0185564 A1 | 6/2017 | Toichi et al. | |
| 2017/0317678 A1 | 11/2017 | Coole et al. | |
| 2018/0089117 A1 | 3/2018 | Nicol | |
| 2018/0089132 A1 | 3/2018 | Atta et al. | |
| 2018/0121121 A1 | 5/2018 | Mehra et al. | |
| 2018/0157825 A1 | 6/2018 | Eksten et al. | |
| 2018/0189231 A1 | 7/2018 | Fleming, Jr. et al. | |
| 2018/0275193 A1 | 9/2018 | Rouge et al. | |
| 2018/0349098 A1 | 12/2018 | Manohararajah | |
| 2019/0042513 A1 | 2/2019 | Fleming, Jr. et al. | |
| 2019/0042924 A1 | 2/2019 | Pasca et al. | |
| 2019/0056969 A1 | 2/2019 | Khandros et al. | |
| 2019/0084296 A1 | 3/2019 | Shaul et al. | |
| 2019/0147323 A1 | 5/2019 | Li et al. | |
| 2019/0158396 A1 | 5/2019 | Yu et al. | |
| 2019/0171604 A1 | 6/2019 | Brewer | |
| 2019/0205734 A1 | 7/2019 | Guntoro | |
| 2019/0213153 A1 | 7/2019 | Pan et al. | |
| 2019/0303297 A1 | 10/2019 | Fleming, Jr. et al. | |
| 2019/0317770 A1 | 10/2019 | Sankaralingam et al. | |
| 2020/0125396 A1 | 4/2020 | Chynoweth et al. | |
| 2020/0159544 A1 * | 5/2020 | Shah | G06F 15/7871 |
| 2020/0159692 A1 * | 5/2020 | Shah | G06F 15/7867 |
| 2021/0055940 A1 | 2/2021 | Shah et al. | |
| 2022/0171716 A1 | 6/2022 | Benisty et al. | |
| 2023/0070690 A1 | 3/2023 | Mugu et al. | |
| 2023/0244748 A1 | 8/2023 | Natarja et al. | |
| 2024/0020261 A1 | 1/2024 | Jordan et al. | |

FOREIGN PATENT DOCUMENTS

| | | |
|---|---|---|
| CN | 101593169 A | 12/2009 |
| CN | 103748574 B | 7/2016 |
| CN | 107636625 B | 1/2018 |
| CN | 108090022 A | 5/2018 |
| EP | 0733234 A | 6/1995 |
| EP | 1372084 A2 | 12/2003 |
| EP | 1877927 B1 | 3/2011 |
| EP | 2441013 A1 | 4/2012 |
| TW | 200801964 A | 1/2008 |
| TW | 200928736 A | 7/2009 |
| TW | 201346758 A | 11/2013 |
| TW | 201610708 A | 3/2016 |
| TW | 201730761 A | 9/2017 |
| TW | 201833767 A | 9/2018 |
| WO | 2010142987 A1 | 12/2010 |

OTHER PUBLICATIONS

PCT/US2020/040832—3rd Party Observation dated Jul. 12, 2021, 15 pages.
PCT/US2020/040832—International Preliminary Report on Patentability, dated Jan. 20, 2022, 16 pages.

(56) References Cited

OTHER PUBLICATIONS

PCT/US2020/040832—International Search Report and the Written Opinion dated Sep. 18, 2020, 18 pages.

PCT/US2023/012723—International Search Report and Written Opinion, dated May 31, 2023, 13 pages.

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Prabhakar et al., SambaNova SN10 RDU: A 7nm Dataflow Architecture to Accelerate Software 2.0, dated Feb. 20-26, 2022, IEEE International Solid-State Circuits Conference, 3 pages.

Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.

Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.

Turkson et al. "Artificial neural network applications in the calibration of spark-ignition engines: An overview," Engineering Science and Technology, an International Journal, vol. 19, Issue 3, Sep. 2016, 1346-1359.

TW 108142191—First Office Action dated, Nov. 3, 2021, 17 pages.
TW 108142191—Notice of Allowance, dated Feb. 21, 2022, 2 pages.
TW 108142191—Response to First Office Action dated Nov. 3, 2021, filed Jan. 26, 2022, 9 pages.
TW 108148376—Notice of Allowance dated Oct. 23, 2020, 5 pages.
TW 108148376—Request for Exam and Voluntary Amendment filed Jun. 30, 2020, 17 pages.
U.S. Appl. No. 16/504,627—Office Action, dated Feb. 12, 2021, 10 pages.
TW 109102852 First Office Action, dated Jul. 29, 2020, 30 pages.
TW 109102852 Notice of Allowance, dated Nov. 4, 2020, 3 pages.
TW 109102852 Response to First Office Action, dated Jul. 29, 2020, 70 pages.
TW 109102852 Voluntary Amendment, dated Jul. 10, 2020, 19 pages.
TW 109114892—Notice of Allowance, dated Apr. 11, 2022, 3 pages.
TW 109114892—Response to First Office Action dated Jul. 22, 2021, filed Oct. 26, 2021, 16 pages.
TW 109114892—Office Action, dated Jul. 22, 2021, 9 pages.
TW 109122772—Office Action, dated Aug. 27, 2021, 11 pages.
TW 109122772—Response to First Office Action dated Aug. 27, 2021, filed Nov. 29, 2021, 15 pages.
TW 110101760—First Office Action dated Mar. 29, 2022, 12 pages.
TW110101760—Notice of Allowance, dated Sep. 21, 2022, 2 pages.
U.S. Appl. No. 16/197,826—Notice of Allowance mailed May 18, 2020, 22 pages.
U.S. Appl. No. 16/197,826—Notice of Allowance mailed Jun. 29, 2020, 11 pages.
U.S. Appl. No. 16/198,086—Notice of Allowance (after RCE) dated Jun. 28, 2021, 9 pages.
U.S. Appl. No. 16/198,086—Notice of Allowance, dated Jan. 15, 2021, 23 pages.
U.S. Appl. No. 16/239,252—Notice of Allowance dated Feb. 12, 2020, 10 pages.
U.S. Appl. No. 16/239,252—Notice of Allowance dated May 14, 2020, 15 pages.
U.S. Appl. No. 16/239,252—Office Action dated Aug. 7, 2019, 8 pages.
U.S. Appl. No. 16/239,252—Response to Final Office Action dated Jan. 8, 2020 filed Jan. 24, 2020, 14 pages.
U.S. Appl. No. 16/239,252—Response to Office Action dated Aug. 7, 2019, filed Sep. 26, 2019, 6 pages.
U.S. Appl. No. 16/239,252 Final Office Action, dated Jan. 8, 2020, 13 pages.
U.S. Appl. No. 16/260,548—Notice of Allowance dated Apr. 29, 2020, 15 pages.
U.S. Appl. No. 16/260,548—Office Action, dated Dec. 26, 2019, 9 pages.
U.S. Appl. No. 16/260,548—Response to Office Action dated Dec. 26, 2019, filed Mar. 10, 2020, 11 pages.
U.S. Appl. No. 16/407,675—Notice of Allowance dated Jun. 1, 2021, 7 pages.
U.S. Appl. No. 16/407,675—Notice of Allowance dated Mar. 14, 2022, 12 pages.
U.S. Appl. No. 16/407,675—Office Action dated Oct. 29, 2020, 7 pages.
U.S. Appl. No. 16/407,675—Office Action, dated May 18, 2020, 9 pages.
U.S. Appl. No. 16/407,675 Response to Final Office Action dated Oct. 29, 2020, filed Dec. 23, 2020, 8 pages.
U.S. Appl. No. 16/407,675 Response to First Office Action dated May 18, 2020, filed Jul. 10, 2020, 11 pages.
U.S. Appl. No. 16/504,627—312 Amendment in response to Notice of Allowance dated Apr. 16, 2021 as filed on May 17, 2021, 22 pages.
U.S. Appl. No. 16/504,627—Notice of Allowance, dated Apr. 16, 2021, 26 pages.
U.S. Appl. No. 16/504,627—Office Action, dated Nov. 13, 2020, 8 pages.
U.S. Appl. No. 16/504,627—Response to Non-Final Office Action dated Nov. 13, 2020, filed Feb. 2, 2021, 6 pages.
U.S. Appl. No. 16/862,445—Notice of Allowance, dated Sep. 17, 2021, 15 pages.
U.S. Appl. No. 16/862,445—Response to Office Action dated Mar. 18, 2021, filed Jun. 9, 2021, 12 pages.
U.S. Appl. No. 17/093,543—Office Action dated Apr. 19, 2022, 32 pages.
U.S. Appl. No. 17/093,543—Response to Office Action dated Oct. 12, 2021, filed Jan. 20, 2022, 4 pages.
U.S. Appl. No. 17/322,697—Non-Final Office Action, dated Apr. 7, 2023, 19 pages.
U.S. Appl. No. 17/492,403—Notice of Allowance, dated Oct. 12, 2022, 7 pages.
U.S. Appl. No. 18/107,613—Non-Final Rejection dated May 13, 2024, 8 pages.
U.S. Appl. No. 18/383,718—Notice of Allowance, dated Jul. 15, 2024, 12 pages.

Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.

Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.

Wang, et al., "Reconfigurable Hardware Accelerators: Opportunities, Trends and Challenges," Cornell University, Dec. 13, 2017, 25 pages.

Wentzlaff et al., On-Chip Interconnection Architecture of the Tile Processor, IEEE Micro., IEEE Service Center, Los Alamitos, CA., US, US , (Sep. 1, 2007), vol. 27, No. 5, doi: 10.1109/MM.2007.4378780, ISSN 0272-1732, pp. 15-31, XP011196754.

Wijtvliet et al., "Coarse Grained Reconfigurable Architectures in the Past 25 Years: Overview and Classification," IEEE 2016, pp. 235-244.

Wijtvliet, Course Syllabus for "Accelerators and Coarse Grained Reconfigurable Architectures," Advanced School for Computing and Imaging, 2017, 2 pages.

Yan Ming, Yang Ziyu, Li Sikun, "A Reconfigurable Soc for Block Ciphers with a Programmable Dataflow Structure," 2011 ThirdInternational Conference on Communications and Mobile Computing (Year: 2011) 4 pages.

Zhang, "Design of Coarse-Grained Reconfigurable Architecture for Digital Signal Processing," Implementation Aspects, Master of Science Thesis, Feb. 2009, 110 pages.

(56) References Cited

OTHER PUBLICATIONS 80.192.25.230: "Producer-consumer problem", Feb. 7, 2013 {Feb. 7, 2013), XP055530821, Retrieved from the ntemet: URL:https://en.wikipedia.org/w/index.php?t>ille=Producer"/oE2%80%93consumer_problem&old d=537111527 [retrieved on Dec. 6, 2018], 4 pages.
AMBA AXI and ACE Protocol Specification, ARM, as early as Jan. 2003, 440 pages.
Ando et al., "A Multithreaded CGRA for Convolutional Neural Network Processing," Scientific Research Publishing, Circuits and Systems, Jun. 2017, pp. 149-170.
Anonymous, Activation Function, Wikipedia, Retrieved on Dec. 3, 2021, 5 pages. Retrieved from [URL: https://n.wikipedia.org/wiki/Activation_function].
Anonymous, Activation Function, Wikipedia, Retrieved on Aug. 16, 2019, 3 pages. Retrieved from [ URL: https://en.wikipedia.org/wiki/Activation_function ].
Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.
Benoit et al., Automatic Task Scheduling/ Loop Unrolling using Dedicated RTR Controllers in Coarse Grain Reconfigurable Architectures, Parallel and Distributed Processing Symposium, 2005. Proceedings. 19th IEEE International Denver, CO, USA Apr. 4-8, 2005, Piscataway, NJ, USA, IEEE, Apr. 4, 2005Apr. 4, 2005), pp. 148a-148a, XP010785667, DOI: 10.1109/IPDPS.2005.119, ISBN: 978-0-7695-2312-5, 8 pages.
CA 3120683—Notice of Allowance dated Feb. 17, 2022, 1 page.
CA 3120683—Office Action, dated Sep. 1, 2021, 3 pages.
CA 3120683—Response to First Office Action dated Sep. 1, 2021, filed Dec. 31, 2021, 4 pages.
CA 3120683—Voluntary Amendments, dated Aug. 4, 2021, 9 pages.
CA 3125707—First Office Action, dated Jan. 21, 2022, 3 pages.
CA 3125707—Voluntary Amendments, dated Jan. 4, 2022, 8 pages.
CN 201980089713—First Office Action, dated Feb. 16, 2022, 6 pages.
CN 2020800135801—Voluntary Amendments with translation, dated Jan. 3, 2022, 16 pages.
De Sutter et al., Coarse-Grained Reconfigurable Array Architectures, 2010 Handbook of Signal Processing Systems, 37 pages.
EP 198213613—Response to Rules 161(1) and 162 Communication dated Jul. 1, 2021, filed Jan. 11, 2022, 12 ages.
EP 198213613 Rules 161(1) and 162 Communication, dated Jul. 1, 2021, 3 pages.
EP 19829712.9—Response to Rules 161(1) and 162 Communication dated Jun. 30, 2021, filed Jan. 10, 2022, 11 pages.
EP 19829712.9—Rules 161(1) and 162 Communication, dated Jun. 30, 2021, 3 pages.
EP 20702339.8—Response to Rules 161(1) and 162 Communication, filed Feb. 25, 2022, 10 pages.
EP 20702939.8—Rules 161(1) and 162 Communication, dated Aug. 18, 2021, 3 pages.
EP 20730358—Rules 161(1) and 162 Communication, dated Dec. 17, 2021, 3 pages.
EP 20743938.1—Rules 161(1) and 162 Communication, dated Feb. 15, 2022, 3 pages.
Eppler et al., High speed neural network chip for trigger purposes in high energy physics, IEEE, Proc. of the conference on design, automation and test in Europe, Feb. 1998, 8 pages.
Fiolhais et al., "Overlay Architectures for Space Applications," SpacE FPGA Users Workshop, Apr. 9-11, 2018, pp. 1-20.
Gomar et al. "Precise digital implementations of hyperbolic tanh and sigmoid function," 2016 50th Asilomar Conference on Signals, Systems and Computers, Nov. 6-9, 2016, 4 pages.
Harris et al., Architectures and Algorithms for User Customization of CNNs, ASP-DAC 2018, 32 pages.
Hartenstein, Coarse Grain Reconfigurable Architectures, IEEE, 2001, 6 pages.
Iannucci, "Toward a dataflow/von Neumann hybrid architecture," ISCA '88 Proc. of the 15th Annual ISCA, May 30-Jun. 2, 1988, 10 pages.
Jafri et al., NeuroCGRA: A CGRAs with Support for Neural Networks, 2014 International Conference on High Performance Computing & Simulation (HPCS), 8 pages.
Koeplinger et al., Spatial: A Language and Compiler for Application Accelerators, PLDI '18, Jun. 18-22, 2018, Association for Computng Machinery, 16 pages.
Li, et al., "CATERPILLAR: Coarse Grain Reconfigurable Architecture for Accelerating the Training of Deep Neural Networks," arXiv: 1706.00517v2 [cs.DC], Jun. 8, 2017, 10 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Ming et al., A Reconfigurable Soc for Block Ciphers with a Programmable Dataflow Structure, dated Apr. 18-20, 2011, Third International Conference on Communications and Mobile Computing, 4 pages.
Nicol, "A Course Grain Reconfigurable Array (CGRA) for Statically Scheduled Data Flow Computing," Wave Computing, May 3, 2017, 9 pages.
Nicol, "Wave Computing: A Dataflow Processing Chip for Training Deep Neural Networks," 2017, 25 pages.
Paek et al., "Binary Acceleration Using Coarse-Grained Reconfigurable Architecture," ACM SIGARCH Computer Architecture News, vol. 38, No. 4, Sep. 2010, 7 pages.
PCT/US2019/062287—International Search Report and Written Opinion dated Feb. 5, 2020, 18 pages.
PCT/US2019/062287 International Preliminary Report on Patentability, dated Feb. 19, 2021, 31 pages.
PCT/US2019/062289—International Preliminary Report on Patentability dated Feb. 19, 2021, 27 pages.
PCT/US2019/062289—International Search Report and Written Opinion dated Feb. 28, 2020, 14 pages.
PCT/US2020/012079—International Preliminary Report on Patentability, dated May 7, 2021, 14 pages.
PCT/US2020/012079—International Search Report and Written Opinion mailed Apr. 29, 2020, 18 pages.
PCT/US2020/012079—Second Article 34 Amendment {Response to Informal Communication by Telephone) dated Feb. 2, 2021, as filed on Apr. 2, 2021, 5 pages.
PCT/US2020/014652—International Preliminary Report on Patentability, dated Aug. 12, 2021, 7 pages.
PCT/US2020/014652—International Search Report and Written Opinion dated May 26, 2020, 9 pages.
PCT/US2020/032186—3rd Party Observation dated Jul. 13, 2021, 20 pages.
PCT/US2020/032186—International Preliminary Report on Patentability, dated Nov. 18, 2021, 15 pages.

* cited by examiner

FIG. 18

| A0 | A1 | A2 | A3 | A4 | A5 |
|---|---|---|---|---|---|
| First of Z1 chunks for each of W Switch Units / First of Z2 chunks for each of X PCU Units / First of Z3 chunks for each of Y PMU Units / First of Z4 chunks for each of Z AGCU Units | Second of Z1 chunks for each of W Switch Units / Second of Z2 chunks for each of X PCU Units / Second of Z3 chunks for each of Y PMU Units / Second of Z4 chunks for each of Z AGCU Units | Third of Z2 chunks for each of X PCU Units / Third of Z3 chunks for each of Y PMU Units / Third of Z4 chunks for each of Z AGCU Units | Fourth of Z3 chunks for each of Y PMU Units / Fourth of Z4 chunks for each of Z AGCU Units | Fifth of Z3 chunks for each of Y PMU Units / Fifth of Z4 chunks for each of Z AGCU Units | Sixth of Z4 chunks for each of Z AGCU Units |
| Block (0) | Block (1) | Block (2) | Block (3) | Block (4) | Block (5) |

. . .

TOP LEVEL NETWORK AND ARRAY LEVEL NETWORK FOR RECONFIGURABLE DATA PROCESSORS

PRIORITY APPLICATION

This application is a continuation of U.S. patent application Ser. No. 17/589,467, which is a continuation of U.S. patent application Ser. No. 16/862,445, now U.S. Pat. No. 11,237,996, filed 29 Apr. 2020, which is a continuation of U.S. patent application Ser. No. 16/239,252, now U.S. Pat. No. 10,698,853, filed 3 Jan. 2019, all of which are incorporated herein by reference for any and all purposes.

BACKGROUND

Technological Field

The present technology relates to virtualization of reconfigurable architectures, which can be particularly applied to coarse-grain reconfigurable architectures.

Description of Related Art

Reconfigurable processors, including field programmable gate arrays (FPGAs), can be configured to implement a variety of functions more efficiently or faster than might be achieved using a general purpose processor executing a computer program. So-called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configuration of reconfigurable processors involves compilation of a configuration description to produce an application graph represented by a configuration file, referred to sometimes as a bitstream or bit file, and distributing the configuration file to the configurable units on the processor. To start a process implemented using an application graph, the configuration file must be loaded for that process. To change a process implemented using an application graph, the configuration file must be replaced with a new configuration file.

The procedures and supporting structures for distributing and loading configuration files can be complex, and the execution of the procedures can be time consuming.

In some environments, it may be desirable to execute multiple application graphs simultaneously in a single reconfigurable processor.

It is desirable therefore to provide technologies supporting virtualization of reconfigurable processors.

SUMMARY

A technology is described which enables execution of multiple, unrelated application graphs in a Coarse-Grained Reconfigurable Array processor and in other types of reconfigurable processors, which contain an array of configurable units.

Technology described herein provides for a reconfigurable data processor, comprising an array of configurable units; a bus system connected to the array of configurable units, which is configurable to partition the array of configurable units into a plurality of sets of configurable units, and block communications via the bus system between configurable units within a particular set and configurable units outside the particular set. In addition, a memory access controller connected to the bus system is configurable to confine access to memory outside the array of configurable units, such as mass DRAM, SRAM and other memory classes, originating from within the particular set to memory space allocated to the particular set in the memory outside the array of configurable units.

In embodiments described herein a plurality of memory access controllers includes memory access controllers connected as addressable nodes on the bus system, and configurable to confine access to memory outside the array of configurable units originating from within corresponding sets of configurable units to memory space allocated to the corresponding sets.

An example of the bus system comprises a grid of switches connected to configurable units in the array of configurable units, switches in the grid including circuits to partition the bus system. Switches in the grid can include circuits configurable using port parameters, that enable and disable ports on the switches according to the port parameters.

Sets of configurable units in the plurality of sets of configurable units can be configurable to execute application graphs using virtual addresses. The memory access controller includes or has access to a configurable table to translate virtual addresses in requests originating from an application graph executing within the particular set, to addresses in the memory space allocated to the particular set. A physical address for the purposes of this description is an address used by a memory interface on the bus system that identifies locations in memory space in the external memory, and a virtual address is an address used by an application graph in a particular virtual machine that is translated to a physical address, such as by a memory access controller. In a device described herein, the bus system includes a top level network and an array level network. The top level network is connected to an external data interface for communication with memory outside of the array using physical addresses. The array level network is connected to configurable units in the array of configurable units. In a two level bus system like that described herein, the memory access controller is connected to the array level network and to the top level network, and includes logic to route data transfers between the top level network and the array level network.

The array level network can comprise a grid of switches, in which the switches in the grid, the configurable units in the array of configurable units and the memory access controller are addressable nodes on the array level network.

In some embodiments, a device comprises an array of configurable units including a plurality of tiles of configurable units. The device including such plurality of tiles can be implemented on a single integrated circuit or single multi-chip module. The bus system can comprise switches on boundaries between the tiles including circuits to partition the bus system on the tile boundaries. More generally, an array of configurable units can include blocks of configurable units which for the purposes of partitioning comprise partitionable groups in the array. In some embodiments, a partitionable group may comprise more than one type of configurable unit. In some embodiments, the array can include atomic partitionable groups which include a minimum set of configurable units usable for composing virtual machines. Also, the bus system can be configured to isolate configurable units in the array on boundaries of the partitionable groups.

A device is described in which a configuration controller is connected to the bus system which can be used to swap application graphs in a set of configurable units without interfering with application graphs executing in other sets of configurable units on the same reconfigurable processor. The reconfigurable processor including such configuration controller can be implemented on a single integrated circuit or single multichip module. A configuration controller can include logic to execute a configuration load process, including distributing configuration files to configurable units in individual sets of the configurable units in the array, wherein an application graph in one of the sets of configurable units is executable during the configuration load process in another set of configurable units. Also, a configuration controller can include logic to execute a configuration unload process, including unloading state information from configurable units in individual sets, wherein an application graph in one of the sets of configurable units is executable during the configuration unload process in another set of configurable units. A configuration controller can execute configuration load and unload operations on individual configurable units independently of other sets of configurable units.

In general, technology is described that includes a method for configuring a reconfigurable data processor, comprising an array of configurable units and a bus system connected to the array of configurable units. The method can comprise partitioning the array of configurable units into a plurality of sets of configurable units, by blocking communications via the bus system between configurable units within a particular set and configurable units outside the particular set; and confining access to memory outside the array of configurable units originating from within the particular set to memory space allocated to the particular set in the memory outside the array of configurable units.

Technology described herein provides for dynamic reconfiguration of a CGRA or other type of array of configurable units. A runtime application or service in a host can include a routine for allocation and reallocation of resources within a reconfigurable processor. In one such routine, a host can load application graphs in respective sets of configurable units, and start the loaded application graphs to cause a plurality of application graphs to execute at the same time, or in parallel. When it is desirable to change or update an executing application graph, the host can stop and unload a selected application graph in one of the sets of configurable units, and load another application graph in said one of the sets, while other application graphs in other sets of configurable units in the array of configurable units continue executing.

Other aspects and advantages of the technology described herein can be seen on review of the drawings, the detailed description and the claims, which follow.

BRIEF DESCRIPTION OF THE DRAWINGS

FIG. 18 illustrates an example organization of a configuration file.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
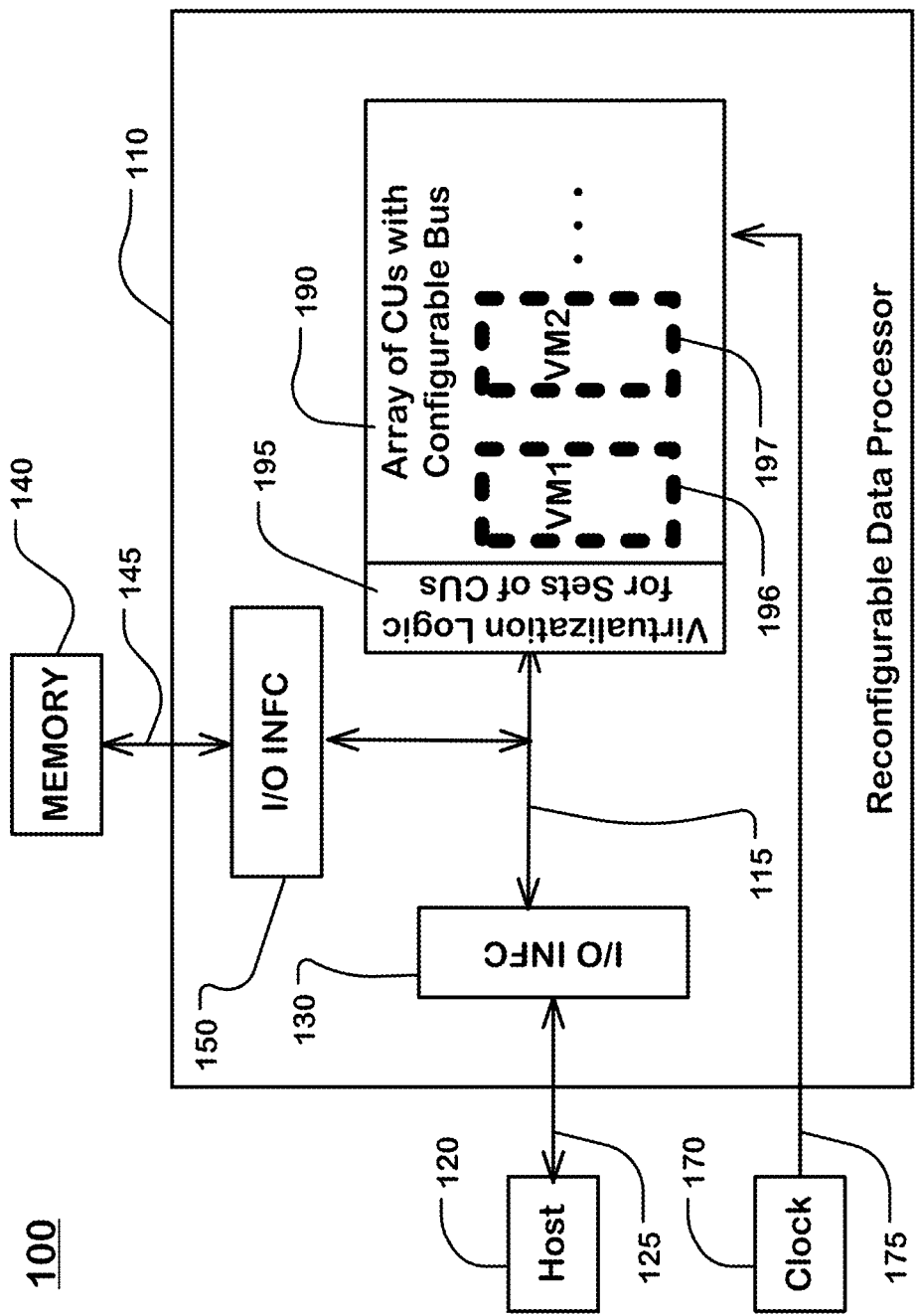
FIG. 1 is a system diagram illustrating a system including a host, a memory, and a reconfigurable data processor.

FIG. 1 is a system diagram illustrating a system including a host 120, a memory 140, and a reconfigurable data processor 110. As shown in the example of FIG. 1, the reconfigurable data processor 110 includes an array 190 of configurable units (CUs) and virtualization logic 195. The virtualization logic 195 can include resources that support or enable simultaneous execution of multiple, unrelated application graphs (or related ones) in an array of configurable units on one die or one multichip module. In the illustration, a first application graph is implemented in virtual machine VM1 in a particular set 196 of configurable units, and a second application graph is implemented in virtual machine VM2 in another set 197 of configurable units.

An application graph for the purposes of this description includes the configuration file for configurable units in the array compiled to execute a mission function procedure or set of procedures using the device, such as inferencing or learning in an artificial intelligence or machine learning system. A virtual machine for the purposes of this description comprises a set of resources (including elements of virtualization logic 195 and of bus system 115) configured to support execution of an application graph in an array of configurable units in a manner that appears to the application graph as if there were a physical constraint on the resources available, such as would be experienced in a physical machine. The virtual machine can be established as a part of the application graph of the mission function that uses the virtual machine, or it can be established using a separate configuration mechanism. In embodiments described herein, virtual machines are implemented using resources of the array of configurable units that are also used in the application graphs, and so the configuration file for the application graph includes the configuration data for its corresponding virtual machine, and links the application graph to a particular set of configurable units in the array of configurable units.

The virtualization logic 195 can include a number of logical elements, including circuits for partitioning the array 190, one or multiple memory access controllers and one or multiple configuration load/unload controllers, as described in more details below.

The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment.

The processor 110 can be implemented on a single integrated circuit die or on a multichip module. An integrated circuit can be packaged in a single chip module or a multi-chip module (MCM). An MCM is an electronic package consisting of multiple integrated circuit die assembled into a single package, configured as a single device. The various die of an MCM are mounted on a substrate, and the bare die of the substrate are connected to the surface or to each other using for some examples, wire bonding, tape bonding or flip-chip bonding.

The processor 110 includes an external I/O interface 130 connected to the host 120 via lines 125, and external I/O interface 150 connected to the memory 140. The I/O interfaces 130, 150 connect via a bus system 115 to the array 190 of configurable units and to the virtualization logic 195. The bus system 115 may have a bus width of one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file for an application graph and a virtual machine, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file for an application graph in a virtual machine can then be sent in a distribution sequence as described herein to configurable units in the set of configurable units in array 190 corresponding to the virtual machine, while application graphs in other sets of configurable units, or other virtual machines, can continue to simultaneously execute. In support of virtualization, the configuration file can include parameters used by circuits to partition the array and parameters used by memory access controllers and configuration load and unload logic allocated to particular virtual machines.

An external clock generator 170 or other internal or external clock signal sources can provide a clock signal 175 or clock signals to elements in the reconfigurable data processor 110, including the array 190 of configurable units, and the bus system 115, and the external data I/O interfaces.

Figure 2:
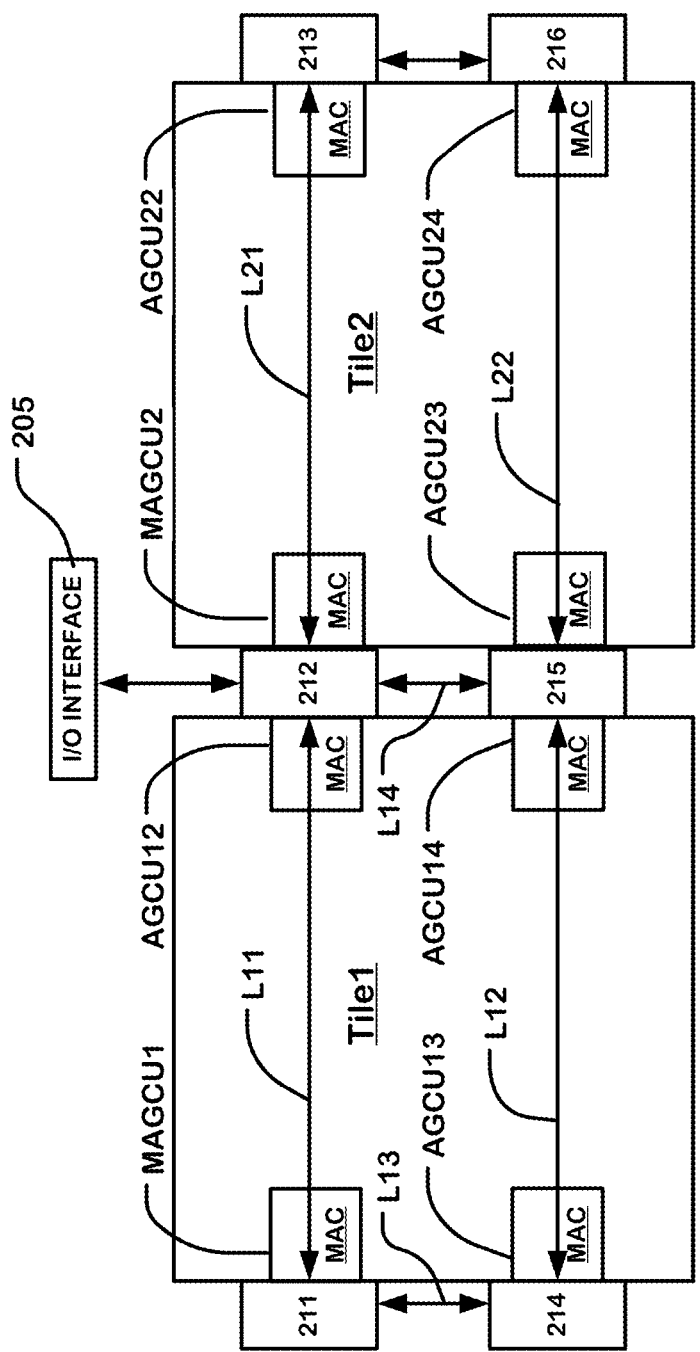
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor which can be implemented on a single integrated circuit die or on a multichip module. In this example, the CGRA processor has 2 tiles (Tile1, Tile2). The tile comprises a set of configurable units connected to a bus system, including an array level network in this example. The bus system includes a top level network connecting the tiles to external I/O interface 205 (or any number of interfaces). In other embodiments, different bus system configurations may be utilized. The configurable units in each tile are addressable nodes on the array level network in this embodiment.

Each of the four tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile. In other embodiments, different numbers of AGCUs may be used, or their function may be combined with other components in the CGRA processor or reconfigurable elements in the tile.

Nodes on the top level network in this example include one or more external I/O interfaces, including interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU. All of the AGCUs in a tile include a memory access controller (MAC) in this example. In other embodiments, a memory access controller can be implemented as a separate node on the array level and top level networks, and includes logic to act as a gateway between the array level and top level networks that confines communications with a set of configurable units executing a graph to memory space allocated to the set of configurable units, and optionally other allocated resources, accessible using the top level network. The memory access controller can include address registers and address translation logic configurable to confine accesses to memory outside the array of configurable units to memory space allocated to sets of configurable units from which the accesses originate, or to which data from memory outside the array of configurable units is directed.

The MAGCU1 includes a configuration load/unload controller for Tile1, and MAGCU2 includes a configuration load/unload controller for Tile2 in this example. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (211-216) connecting to each other as well as to other nodes on the top level network, including the AGCUs, and I/O interface 205. The top level network includes links (e.g. L11, L12, L21, L22) connecting the top level switches. Data travels in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, and top level switches 212 and 213 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, A R M, 2017.

Top level switches can be connected to AGCUs. For example, top level switches 211, 212, 214 and 215 are connected to MAGCU1, AGCU12, AGCU13 and AGCU14 in the tile Tile1, respectively. Top level switches 212, 213, 215 and 216 are connected to MAGCU2, AGCU22, AGCU23 and AGCU24 in the tile Tile2, respectively.

Top level switches can be connected one or more external I/O interfaces (e.g. interface 205).

Figure 3A:
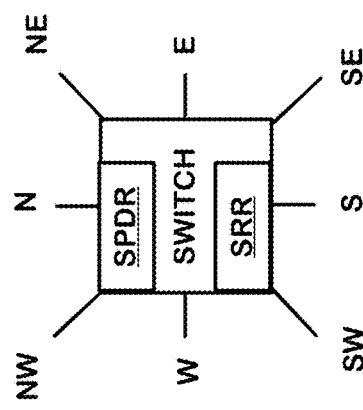
FIG. 3A illustrates an example switch unit connecting elements in an array level network.
Figure 3:
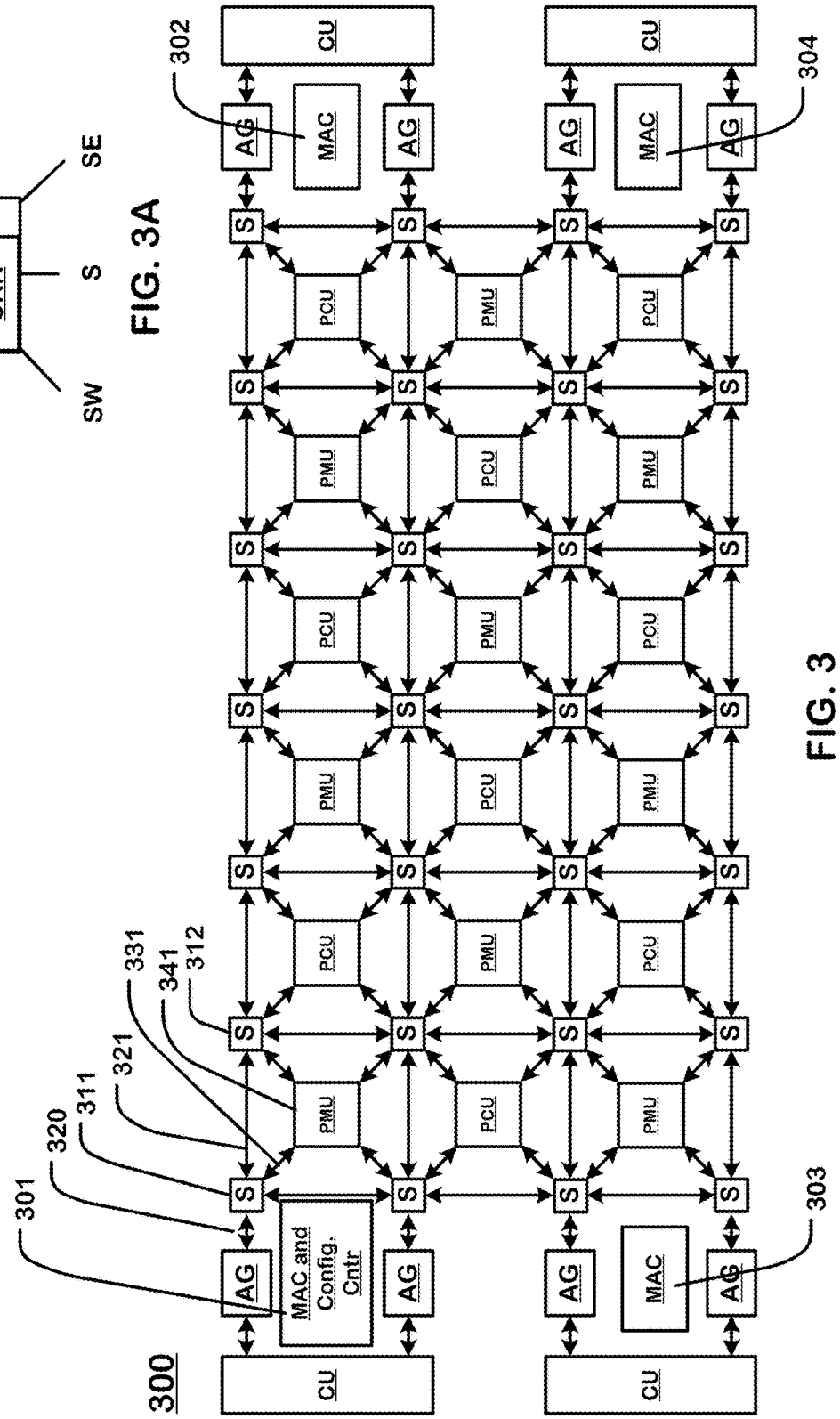
FIG. 3 is a simplified diagram of a tile and an array level network usable in the configuration of FIG. 2, where the configurable units in the array are nodes on the array level network.

FIG. 3 is a simplified diagram of a tile and an array level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can includes:

A bit to indicate if the chunk contains scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

In an embodiment of logic to partition the array of configurable switches, the switches include configuration data such as a switch port disable register SPDR and a switch routing register SRR. In one embodiment, each switch in the array is configurable using the configuration load and unload processes, to block communications using one or more of the switch ports on the switch. Thereby a set of switches surrounding a set of configurable units can be configured to partition the tile into a plurality of sets of configuration units, usable by different application graph graphs.

In another embodiment in which there are multiple tiles, only switches on outer rows and outer columns of the tiles are configurable using the configuration load and unload processes, to allow or to block communications using one or more of the switch ports across tile boundaries. For example, a switch port disable register can be set to disable communication across tile boundaries.

During execution of a virtual machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
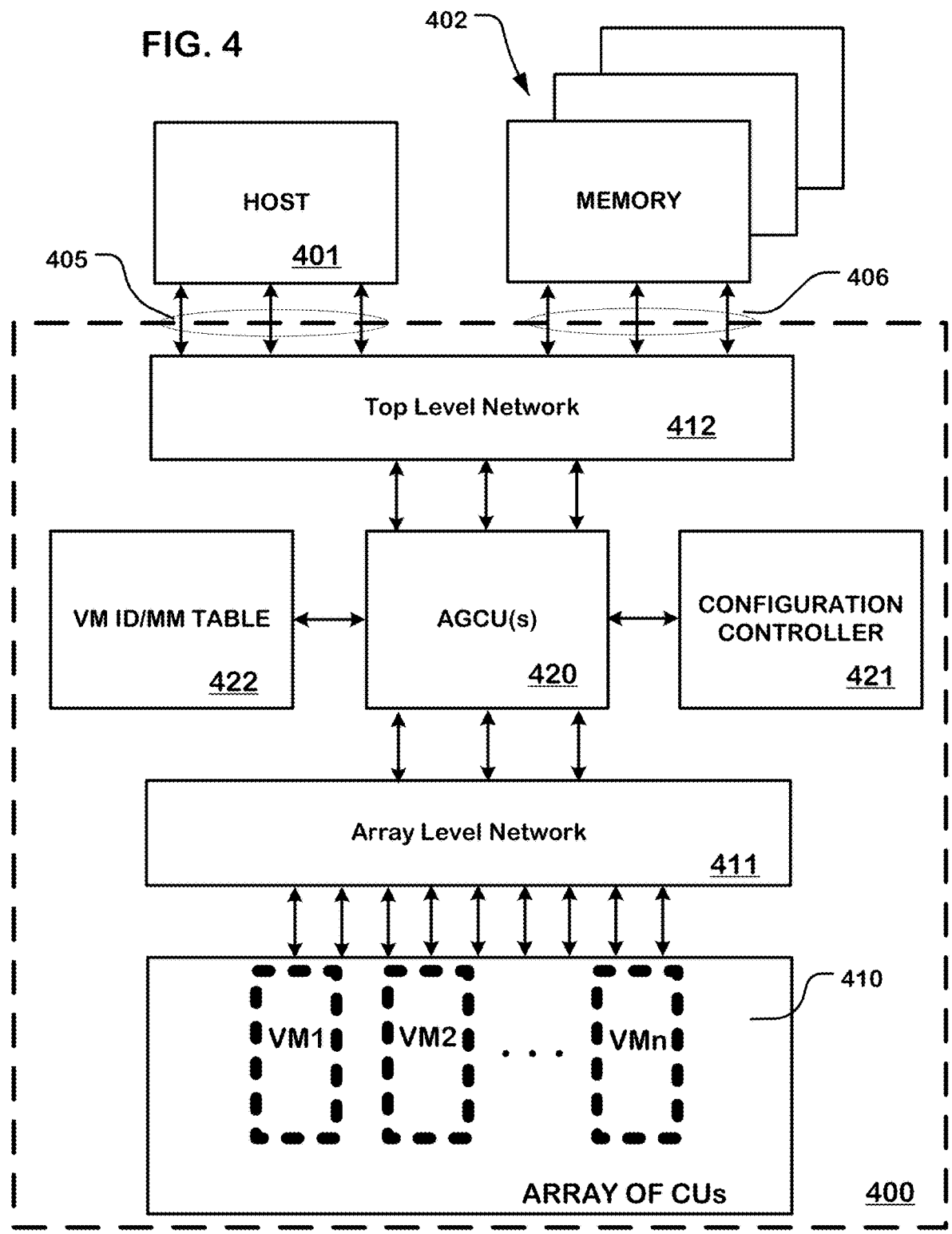
FIG. 4 is a block diagram of a system including an array of configurable units and resources implementing virtual machines.

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

Figure 6:
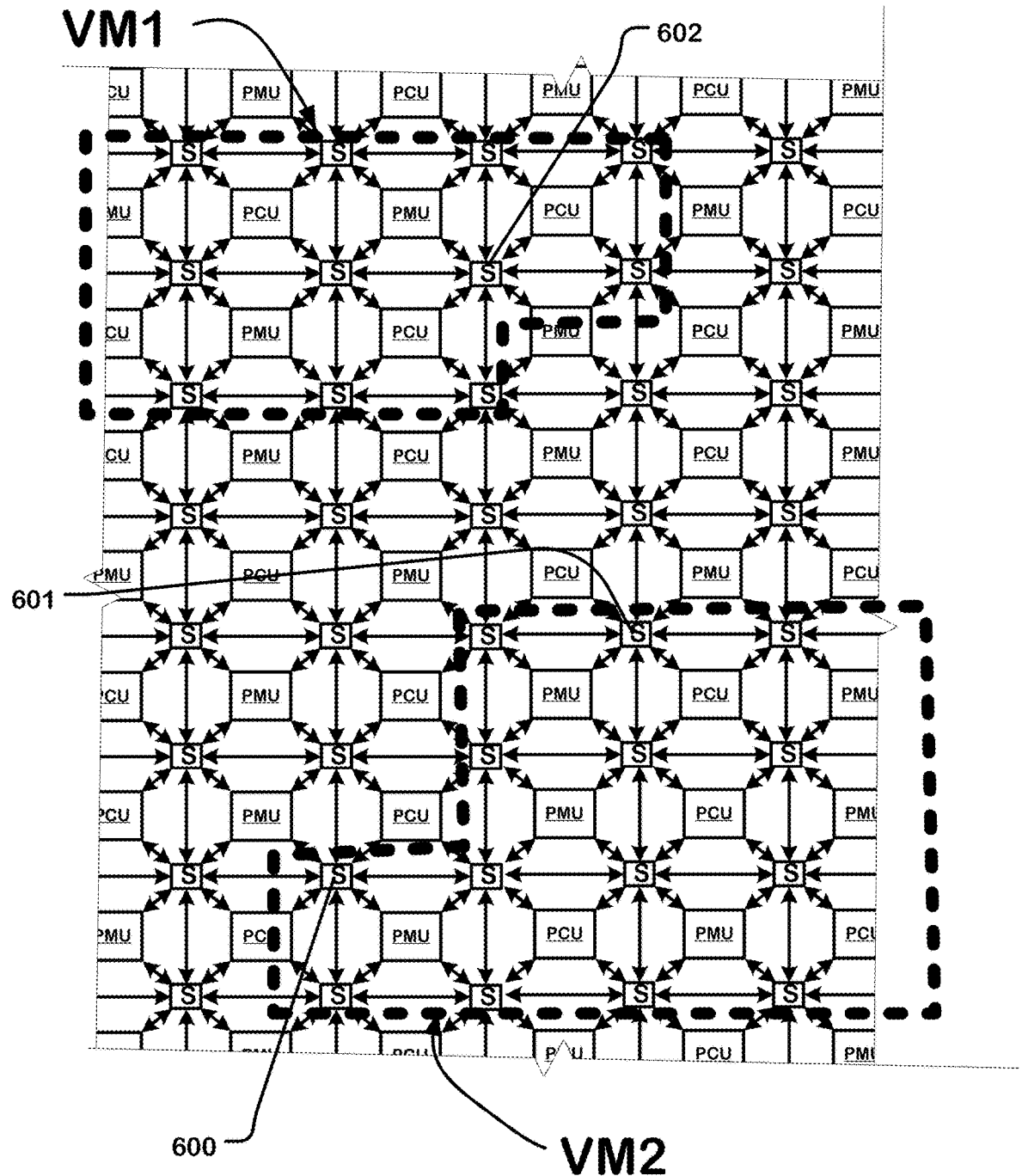
FIG. 6 illustrates a portion of an array of configurable units partitioned into a plurality of sets of configurable units.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits. An example shift register structure is shown in FIG. 6.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains buffers for organizing data to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

As mentioned above, each of the AGCUs in the illustrated embodiment includes a memory access controller MAC 301, 302, 303 and 304. Each of the memory access controllers can be dedicated to all of the configurable units in the tile. Alternatively, different graphs set up by a configuration file may reside on different partitioned sets of configurable units in the tile, and each of the partitioned sets can be allocated by the configuration file to one of the memory access controllers connected to a switch inside the partitioned set.

FIG. 4 illustrates a system including a CGRA device 400 coupled to an external host 401 and external memory 402. There can be a plurality of interfaces 405 coupling the device 400 to the host 401, including for example PCIE type interfaces or other types of interfaces suitable to a particular implementation. One or more of the interfaces 405 can be network connections, including Internet-based network connections. The host 401 can comprise any system, including cloud-based systems capable of executing a runtime program in coordination with the device 400.

There can be a plurality of interfaces 406 coupling the device 400 to memory 402, including for example high-speed double data rate interfaces suitable for connection to high density DRAM memory, or other types of interfaces suitable for a particular implementation.

The CGRA device 400 includes an array 410 of configurable units that is coupled to an array level network 411. In this illustration, the array is partitioned into a plurality of sets of configurable units VM1, VM2, ... VMn. The array of configurable units can support different "shapes" of virtual machines. For example, in some embodiments, there can be a minimum-sized set of configurable units and other CGRA resources (atomic group) that can support a virtual machine whose resource needs match the resources of the atomic group. Larger VMs can be composed of aggregate sets of atomic groups to compose different VM shapes. In one example, the atomic group is a tile as illustrated in FIG. 3, and VMs can span several tiles. In other embodiments, the atomic group can be a fraction of a tile (a subset of rows and columns), with logic to isolate VM communications, memory, and load/unloading of VMs composed of different configurations of atomic groups from each other.

The array level network 411 is also coupled to one or more address generation and coalescing units AGCUs 420. The AGCUs 420 are coupled to a top level network 412, which in turn is coupled to the interfaces 405, 406 for communication with external resources including the external host 401 and the external memory 402.

The AGCUs 420 include logic that acts as a gateway between the array level network 411 and the top level network 412.

The gateway function of the AGCUs includes a memory access controller that utilizes in this example, a mapping table 422 that maps virtual machines memory space used to confine communications between sets of configurable units in the array 410 to regions in memory allocated to virtual machines that are implemented by corresponding sets of configurable units.

In one embodiment, any memory accesses through the AGCU are filtered by the mapping table 422. If a memory access is attempted from a particular set of configurable units outside the memory space allocated to that particular set of configurable units, then it is blocked. In some embodiments, in addition to blocking the access, an exception message can be sent to the host indicating a memory access violation by the particular application graph running in that set of configurable units.

The AGCUs in this example also include a configuration controller 421, used to load and unload graphs from corresponding sets of configurable units in the array, in support of the virtual machines.

The mapping table 422 can be configured as part of a configuration file for the corresponding AGCU 420.

Figure 5:
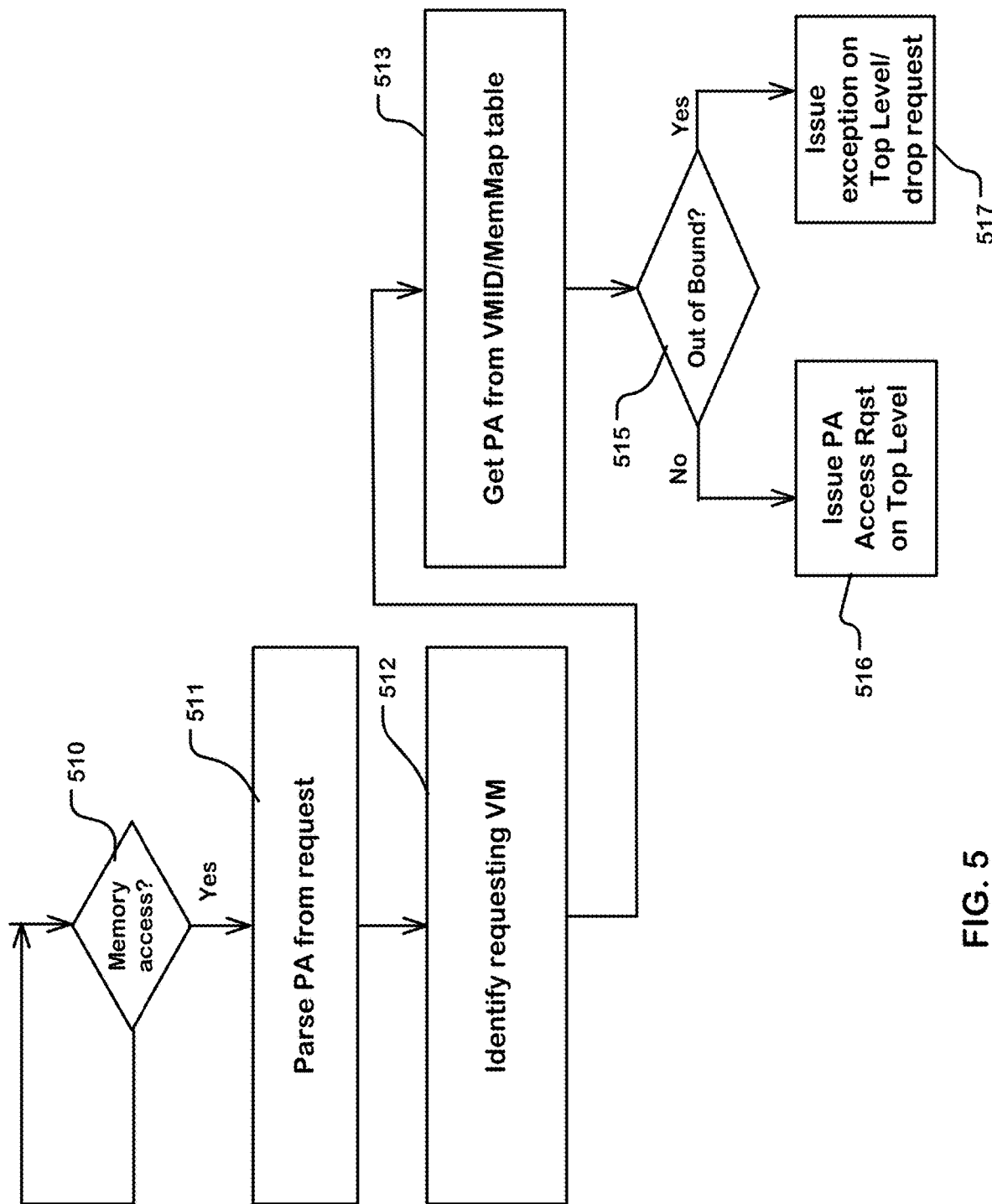
FIG. 5 is a flowchart of a procedure executed by a memory access controller in a system like that of FIG. 4.

FIG. 5 is a flowchart illustrating logic executed by a memory access controller in an AGCU, such as can be used in the systems described above. In this flow, the AGCU during execution of an application graph in a set of configurable units that includes the AGCU can monitor communications on the array level network for a memory access (510). When a memory access is received, the virtual address (i.e. the address used by the application graph executing in the particular virtual machine) in the request is parsed (511). The source of the request is matched to a particular virtual machine (512). The virtual address is translated to a physical address (i.e. an address to memory outside of the array of configurable units) using the mapping table 422. This can be done by looking up a memory map MM using the identifier VMID of the virtual machine allocated to the particular set of configurable units (513). The memory access controller determines whether the access maps to a physical address that is out of bounds of the memory space allocated to the virtual machine (515). If the access is not out of bounds, then a memory access request is issued on the top level network using the physical address (516). If the access is out of bounds, then an exception is issued on the top level network, and the request is dropped (517).

This flowchart describes the logic for a request from inside a particular set of configurable units in which a particular virtual machine is executing. A similar process can be executed for data transfers from the top level network destined to the particular set of configurable units.

Sets of configurable units in the plurality of sets of configurable units are configurable to execute application graphs using virtual addresses, and the memory access controller includes or has access to a configurable table to translate virtual addresses in requests originating from an application graph executing within the particular set, to addresses in the memory space allocated to the particular set. In some examples, the virtual addresses are generated in an AGCU in response to communications from other units in the array. These virtual addresses are converted to physical addresses in the memory access controller.

In one embodiment, the memory access controller is configurable to allocate each application graph to numerous memory regions. The mapping can be implemented according to a maximum number of regions to be included in the allocated memory space using a base/bounds approach. Assuming for example that memory space allocated to each application graph can include a maximum of 16 memory regions, the compiler can assign a region ID statically using bits 63:60 of address registers in the AGCU.

In one approach a compiler assigns a base memory address of 0 and a size to each region. It also assigns an indicator to validate the use of each assigned region.

The assigned regions are contained within the configuration file generated by the compiler. This could take the form of a X-entry region table where X is an integer, and each table entry is a structure with the following fields:

Valid—the table entry is assigned;
Size—the N-bit size of the region; the region may be a non-power-of-two in size; and A list of associations for each region that binds the AGCU memory address generators (counter/ALU outputs) to a given region.

At bitfile load time, entries from the region table are used to program the valid, base, and bounds registers in each AGCU linked to the set of configurable units used to implement the application graph. Depending on the region binding mechanism, each AGCU address generator can also be bound to a particular region. Base addresses can be assigned by the runtime in some examples.

When the AGCU generates a memory address and length in response to access request originating from configurable units within its set of configurable units, the following actions are performed, prior to sending a transaction with the address on the top level network.

The Z-bit address in this X region example can include 2 parts. A number of upper most bits (Z−1:W) identify a region access register. The lower bits (W−1:0) identify the relative virtual offset in the region.

The AGCU looks up the base/bounds of the physical region using bits (Z−1:W) of the virtual address. The offset in bits is added to the base register for that region to produce the actual DDR physical address. The base value is incremented by the length, and the resulting extent address is checked against the limit register. If the extent address is less than or equal to the limit, the address and request is passed to the DDR via the top level network for processing.

If the extent address exceeds the limit, a run-time exception is generated, the top level network request is suppressed, and the AGCU stops processing further address requests from that address generator.

In an alternative embodiment, the memory access controller can implement a virtual address (VA) to physical address (PA) mapping using virtual to physical translation using other approaches. For example, in a VA-PA Buffer translation approach, the runtime software maps compiler generated address regions to available memory space in physical memory through the process of VA-PA translation. This allows runtime to partition a large virtual address space into multiple physical address spaces which could be spread across multiple arrays of configurable units. The physical address space can be partitioned into segments, having in some cases a minimum size (e.g., 1 MB) and a maximum size (e.g., 1 TB).

In order to efficiently translate the virtual address to a physical address, each memory access controller can implement a 16 entry VA-PA Buffer which holds the mapping information for 16 virtual segments. The VA-PA Buffer in this example is fully associative and is loaded from the bit-file (configuration file) during configuration load. Each entry of VA-PA Buffer can also be written through register writes. Each VA-PA Buffer entry can consist of 2 sub-fields: VSID_PA and V_SSIZE. Each of these sub-fields are described in the table below:

| VSID_PA: | | |
|---|---|---|
| Bits | Field | Description |
| N−1:0 | Physical Address | Translated Physical address specifying the base physical address of the continuous virtual segment, whose bits are significant down to the segment size boundary. |
| M:N | VSID | Virtual Segment ID Corresponds to the upper bits virtual address. |

| V_SSIZE: | | |
|---|---|---|
| Bits | Field | Description |
| P−1:0 | SSIZE | Specifies the size of segment. The size of the segment is a function of SSIZE |
| P | Valid | Specifies a Valid entry |

The AGCU populates its VA-PA Buffer from the VA-PA Buffer structure in the bit-file in the configuration load process.

During execution of the application graph in the virtual machine, a virtual address is generated based on the application graph in the set of configurable units linked to the AGCU.

The memory access controller translates the virtual address by searching each VA-PA Buffer entry for a matching virtual segment.

Translation errors can be detected by the memory access controller, including for example:
1. Translation not present: The VA of the request does not match the VSID bits of any of the VA-PA Buffer entries.
2. Multiple matches: The VA of the request matches the VSID bits of multiple entries.
3. SSIZE greater than a maximum: The SSIZE of the matching entries is greater than a set maximum.

These errors can be recorded in a status register along with the VA which caused the error. Also, on a translation error, the memory access controller can send an interrupt or other type of notification to the Host, drop the request which caused the error, and stop processing any new requests.

FIG. 6 illustrates an array of configurable units such as those described in reference to FIG. 3, including PCUs, PMUs and switch units. The configuration load logic and memory access controller logic implemented in other addressable nodes (such as in AGCUs) in the array are not shown. The array level network comprises the grid of switches, which are configurable to connect to other configurable units in the region.

A configuration file can be used to configure the switches to block communications out of selected ports on the switches, in order to partition the array into partitioned sets of configurable units. In the example shown in FIG. 6, the array is configured to include a first set of configurable units labeled VM1 and a second set of configurable units labeled VM2. The switches on the boundaries of the sets of configurable units are configured to block communications from units inside the corresponding set to units outside. For example, the switch 600 can be configured to block the Southwest port, the West port, the Northwest port, the North Port, and the Northeast port, while enabling the East port, the Southeast port, and the South port. The switch 601 can be configured to block the Northwest port, the North port and the Northeast port, while enabling the other ports on the switch. The switch 602 can be configured to block only the Southeast port, while enabling the other ports on the switch. In this manner, the partition of the array of configurable units can be composed to form isolated sets of configurable units. In the embodiments described herein, each of the isolated sets is coupled to a memory access controller and a configuration controller as described above.

More generally, an array of configurable units can include blocks of configurable units which for the purposes of partitioning comprise partitionable groups in the array. In some embodiments, a partitionable group may comprise more than one type of configurable unit, including as illustrated in FIG. 3, PMUs, PCUs, Switches and AGCUs. The bus system can be configured to provide for partition the array into sets of configurable units on boundaries of partitionable groups within the array of any size suitable for a given implementation.

Figure 7:
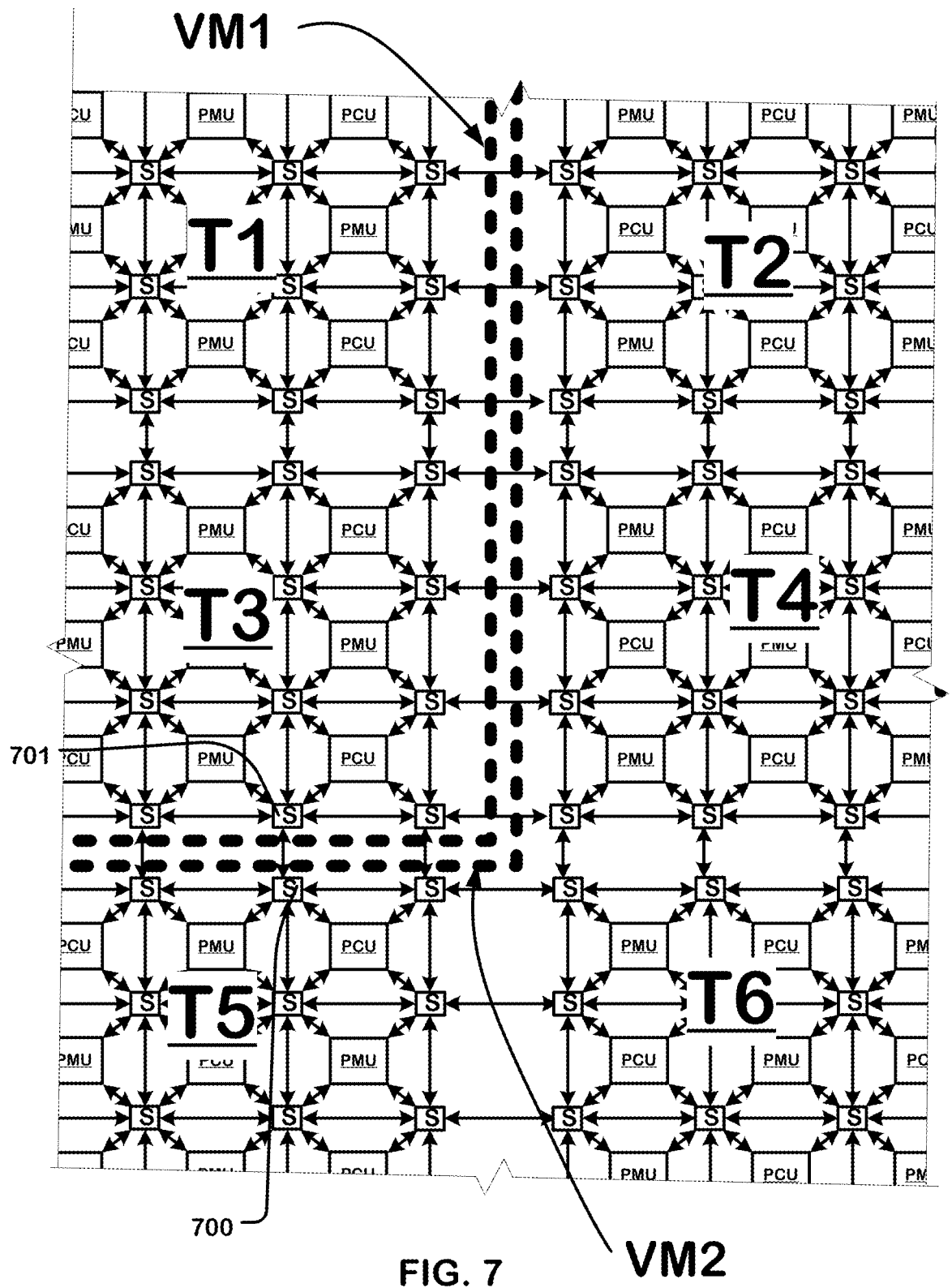
FIG. 7 illustrates a portion of an array of configurable units including a plurality of tiles, partitioned into a plurality of sets of configurable units according to another embodiment.

FIG. 7 illustrates an array of configurable units such as those described in reference to FIG. 3, including PCUs, PMUs and switch units. In this example the array of configurable units includes a plurality of tiles of configurable units. The bus system comprises switches on boundaries between the tiles that include circuits to partition the bus system on tile boundaries. In this example, the sets of configurable units that can be allocated to particular virtual machines or graphs executing in the corresponding sets are partitioned on tile boundaries, and can include one or more tiles.

Thus, as illustrated a first virtual machine VM1 is isolated within a set of configurable units that includes at least parts of tiles T1 and T3. A second virtual machine VM2 is isolated within a set of configurable units that includes at least parts of tiles T2, T4, T5 and T6.

The configuration load logic and memory access controller logic are implemented in other addressable nodes (such as in AGCUs) in the array are not shown, including at least one of each tile.

The switches on the tile boundaries can be referred to as boundary switches which are configurable to block communications on selected ports using a configuration file is discussed above. Other switches in the grid may or may not have the ability to disable ports. For example, the switch 700 can be configured to block all ports that lead from the set of configurable units in tile T5 to the set of configurable units in tile T3. Likewise, the switch 701 can be configured to block ports that cross the boundary from tiles T5 to T3. In this illustrated embodiment, each tile includes a grid of switches arranged in rows and columns. A boundary switch is disposed at the end of each row. All switches in the top and bottom rows of each tile can be boundary switches. Boundary switches can be configured to route to each other as follows. Switches at the innermost chip column of each tile can join to their left/right neighbor, creating a bi-directional east/west link to their neighboring tile, thereby fusing into a single logical tile. Similarly, switches along the innermost chip rows in each tile can join to their north/south neighbor, fusing a north/south tile pair into a single tile. In some embodiments, only one row or column of boundary switches can be implemented on tile boundaries, rather than one row and one column in each tile as illustrated.

Figure 8:
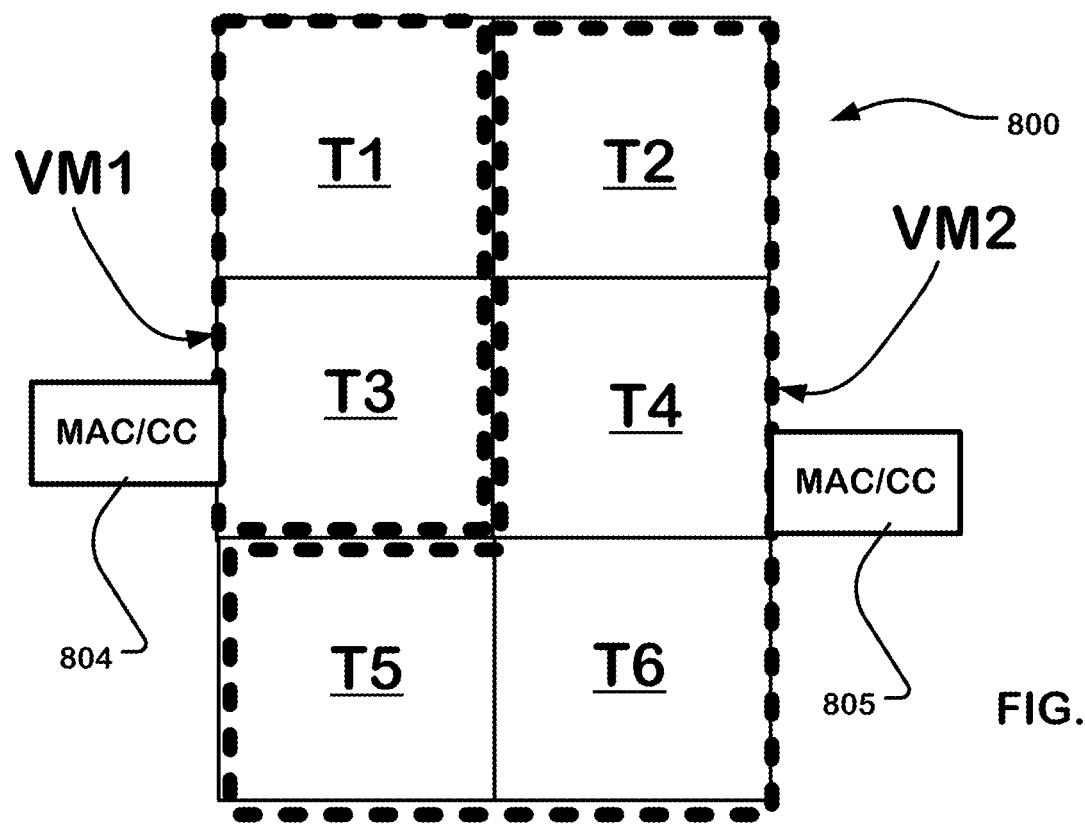
FIG. 8 illustrates one example of an array of configurable units partitioned into a plurality of sets of configurable units on tile boundaries.

The sets of configurable units partitioned in an array of configurable units can have a variety of configurations. FIG. 8 illustrates an example configuration in a system in which the array 800 of configurable units includes a plurality of tiles T1 to T6, with boundary switches configurable to enable or block communication on tile boundaries. In this example, a first virtual machine VM1 is configured within tiles T1 and T3, and a second virtual machine VM2 is configured within tiles T2, T4, T5 and T6. The sets of configurable units configured as virtual machines VM1 and VM2 each include a memory access controller MAC and the configuration controller CC (804, 805) on an addressable node on the array level network accessible from within the set of configurable units.

Figure 9:
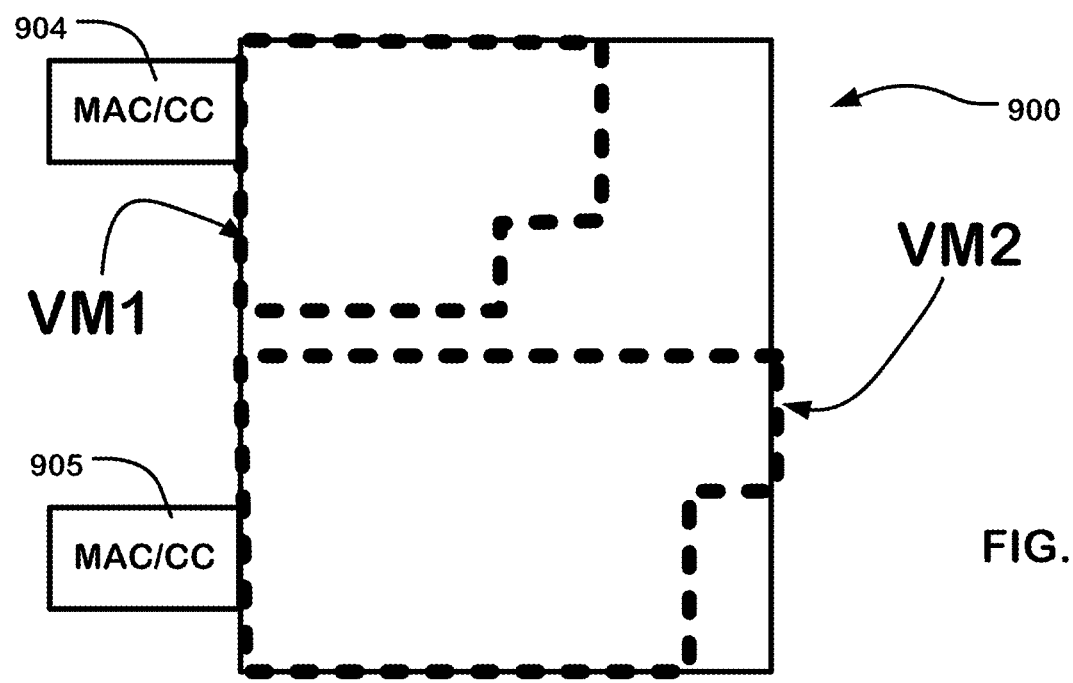
FIG. 9 illustrates another example of an array of configurable units partitioned into a plurality of sets of configurable units.

FIG. 9 illustrates an example configuration in a system in which the array of configurable units may not include tiles, or within a single tile of an array of configurable units, where switches on the array level network are configured to partition the array into a plurality of sets having more flexible boundaries. In this illustration, virtual machine VM1 is implemented in a set of configurable units in the illustrated region in the upper left, and virtual machine VM2 is implemented in a set of configurable units in the illustrated region in the lower part of the array 900. The sets of configurable units configured as virtual machines VM1 and VM2 each include a memory access controller MAC and the configuration controller CC (904, 905) on an addressable node on the array level network accessible from within the set of configurable units.

Figure 10:
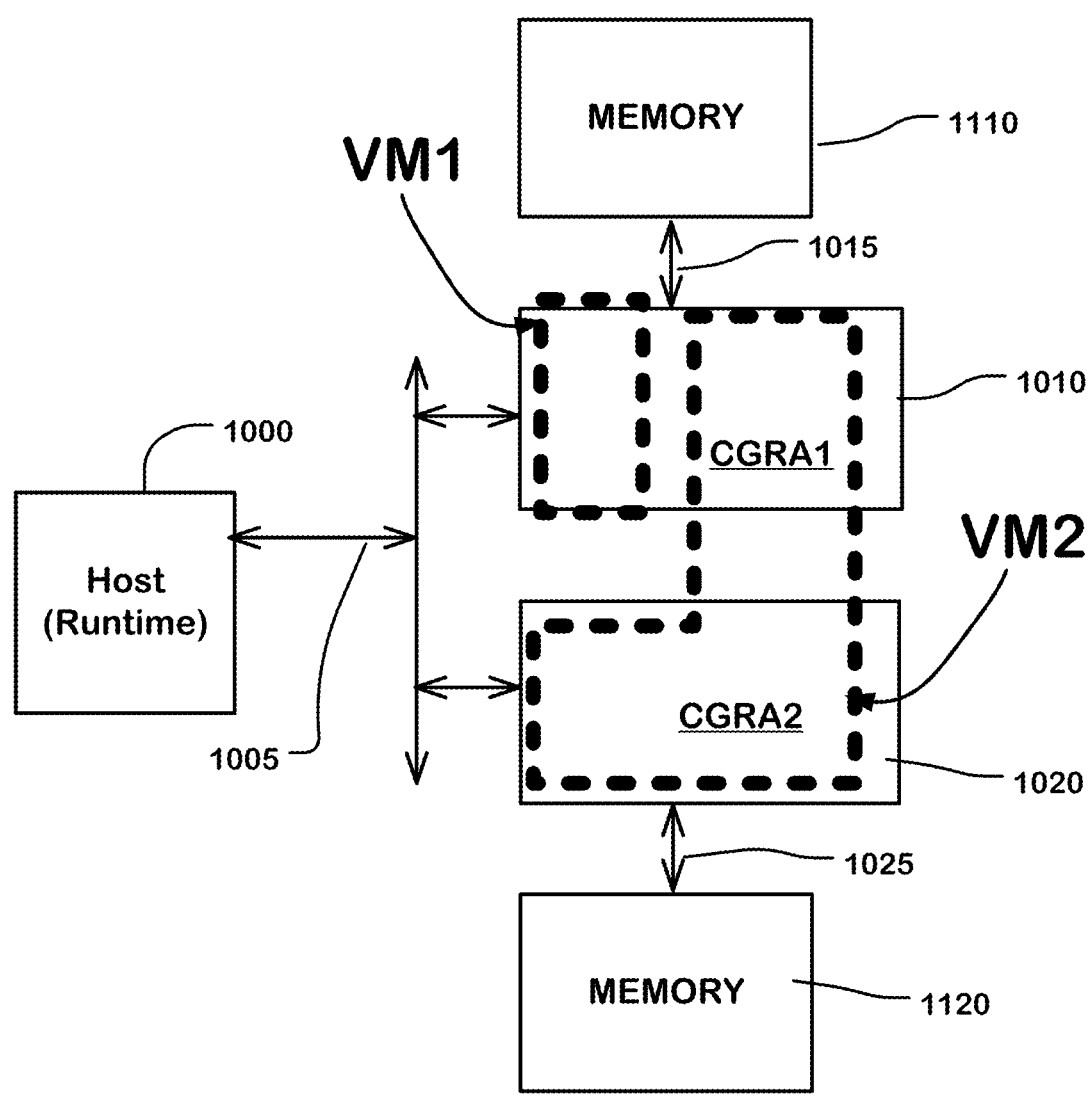
FIG. 10 illustrates implementation of virtual machines across a plurality of CGRA devices.

FIG. 10 illustrates a system including a plurality of CGRAs in which virtual machines can be configured across CGRA1 and CGRA2. The CGRAs can each be implemented on a single integrated circuit. The CGRAs can have an array of configurable units like that discussed above in connection with FIG. 3 and other figures, or any other type of array of configurable units that are partitionable into sets of configurable units with supporting virtualization logic.

The system in FIG. 10 includes a host 1000 which executes a runtime program. Also, a first array of configurable units 1010 implemented on the CGRA1 and a second array of configurable units 1020 is implemented on the CGRA2. Each of the CGRAs is coupled to the corresponding memory 1110, 1120. A host system bus 1005 interconnects the host 1000 with the arrays of configurable units 1010, 1020 on the two CGRAs. High-speed memory interfaces 1015, 1025 couple the CGRAs to corresponding memory 1110, 1120.

In some embodiments, the host 1000 can communicate with the memory 1110 and the memory 1120 via top-level networks in the CGRAs.

In FIG. 10, a first virtual machine VM1 is configured in a set of configurable units confined to the array 1010 on CGRA1. Also, a second virtual machine VM2 is configured in a set of configurable units that includes configurable units in the array 1010 on CGRA1, and configurable units on the array 1020 on CGRA2.

Figure 11:
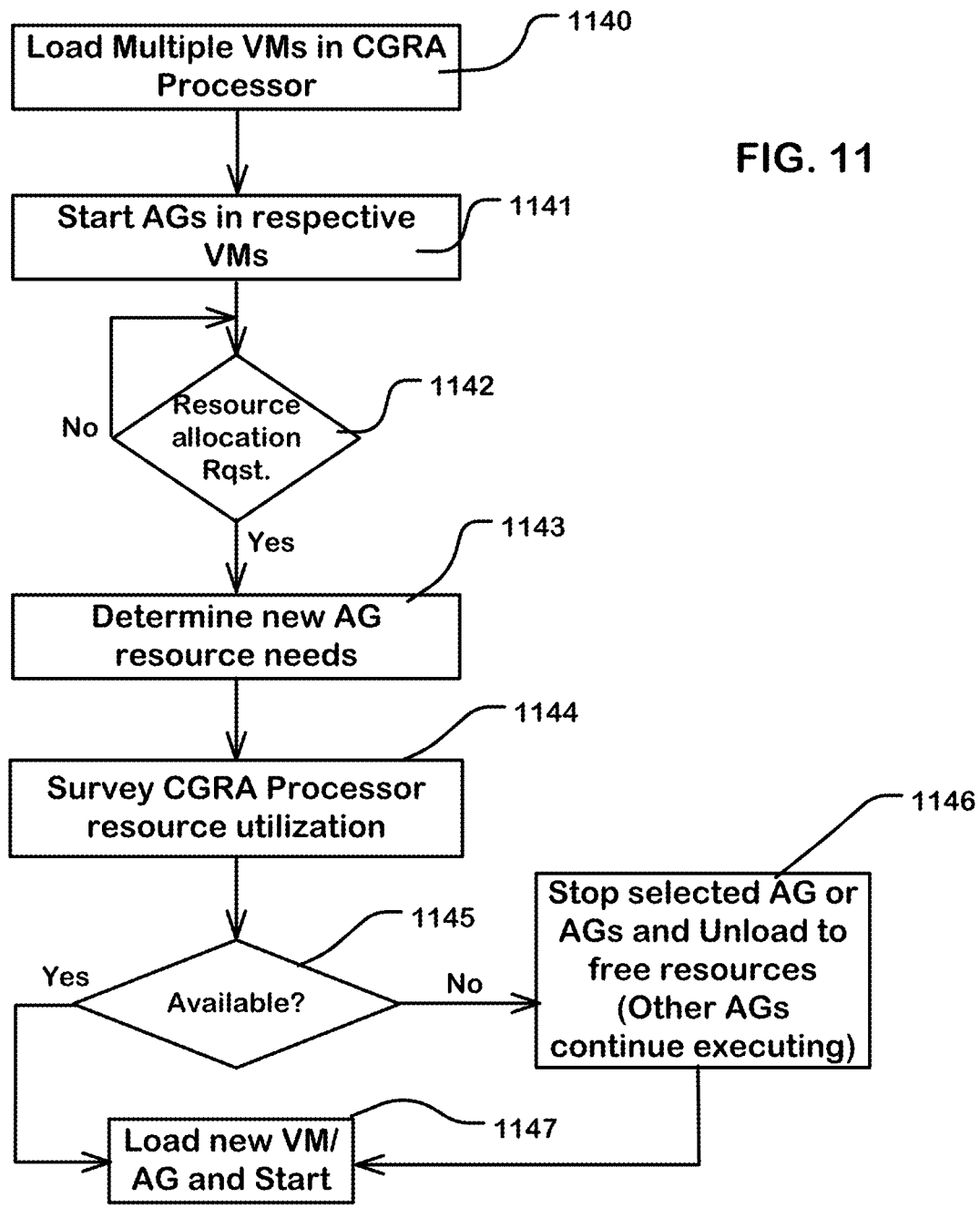
FIG. 11 is a flowchart of a procedure for allocating virtual machine resources in an array of configurable units.

FIG. 11 is a flowchart illustrating the ability of a system supporting virtual machines as described herein to perform resource allocation routines to make optimal use of the arrays of configurable units in the system. In the simplified flowchart, an application executing on a host at runtime, or other monitoring service, can load multiple VMs and corresponding application graphs (AGs) in an array of configurable units of a reconfigurable processor (1140). The host application can send commands to initiate execution of loaded AGs so that multiple AGs are simultaneously executing within their respective VMs (1141). While the AGs are executing, the host application can monitor for a request to allocate resources to implement a virtual machine for a particular application graph (1142), such as when an executing AG needs to be updated with a new AG, or a higher priority AG needs to be initiated. The service then determines the needs of a new virtual machine which can implement the new AG (1143). Also, the service can survey resource utilization in the array of configurable units in the reconfigurable processer, and more generally in all available reconfigurable processers in the system (1144). The needs of the new AG and the utilization of resources by executing AGs are compared to determine whether there are available resources to be allocated in response to the request (1145). If resources are not available, then the service can select an application graph having lower priority, stop the selected AG (using a checkpoint if available) and unload the AG to free the resources (1154). In some embodiments, the service can wait until resources become available for other reasons. In systems implementing VMs for executing AGs, the other AGs can remain executing while the selected AG is stopped and unloaded. If the resources are available, then a VM can be provisioned using the newly available set of configurable units, and the new AG configuration file can be loaded, and started (1155).

In general, virtualization enables allocation and reallocation of resources in a manner that can change during execution of an application graph. In order to fully checkpoint an application graph, application graphs can be compiled with quiescent points where the application graph has no outstanding memory or host transactions, and in which it can be stopped in a consistent fashion across tiles and chips. In one approach, the compiler can insert checkpoint operations at particular points in the graph execution. These may correspond to completion of a certain number of outermost loops or other execution-related events.

At a checkpoint, the application graph is stopped, and a configuration unload can be executed that includes state information of the configurable units usable to restart the paused application graph. Thus, the configuration unload process can include dumping scratchpad memory (e.g. PMU memory in the Plasticine example), pipeline and control register state, and switch and memory access controller or AGCU state.

Figure 12:
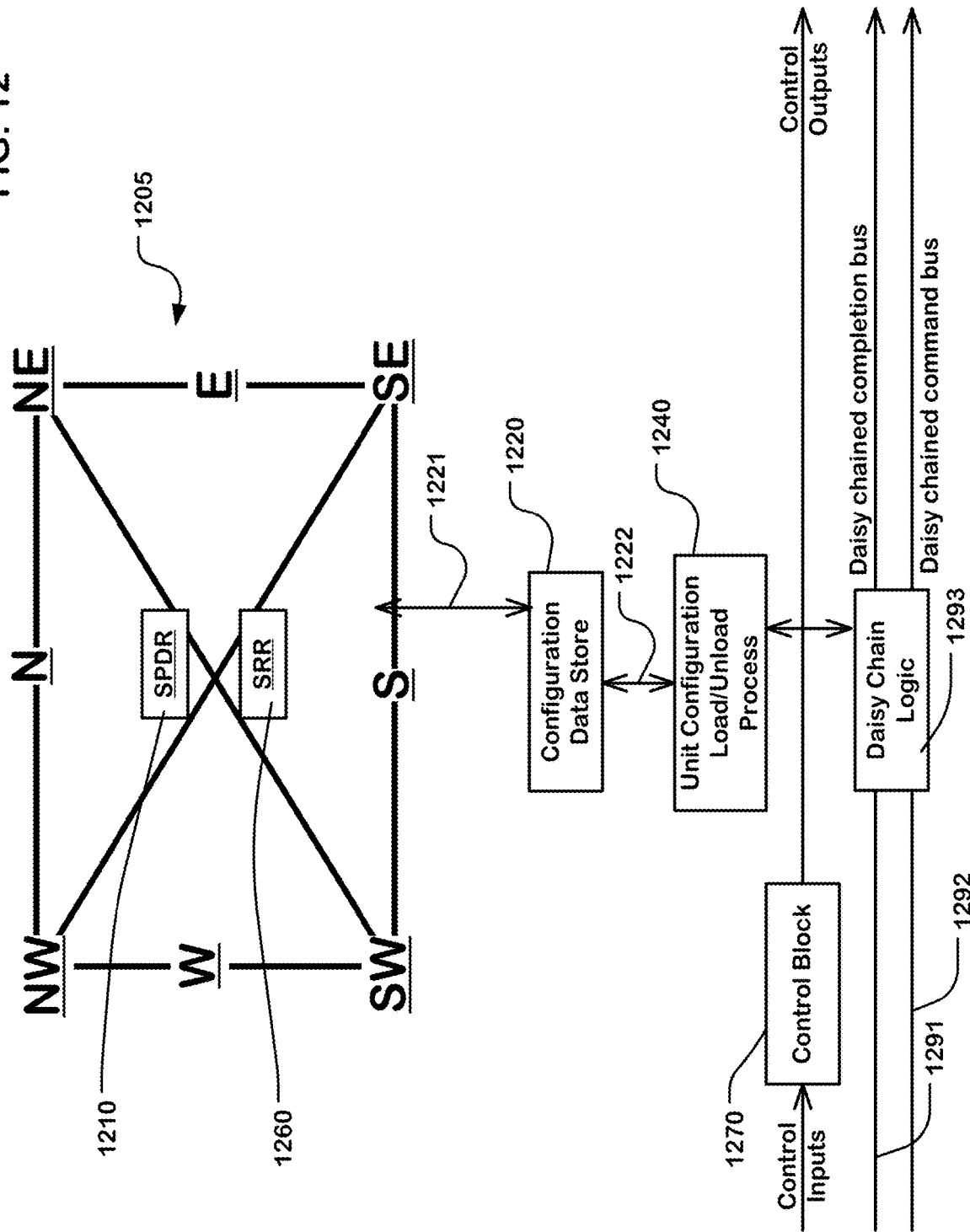
FIG. 12 is a block diagram illustrating an example of a configurable switch usable in an array of configurable units.

FIG. 12 is a block diagram illustrating an example configurable switch usable in an array of configurable units as described herein. The configurable switch includes circuitry 1205 for arbitrating communications among vector, scalar and control buses in the array level network. In this embodiment, each switch includes circuitry 1205 having eight ports, including North, South, East and West ports configured for connection to adjacent switches in the grid of switches. Also, the eight ports include Northeast, Southeast, Southwest and Northwest ports configured for connection to other types of configurable units, such as PCUs, PMUs, and AGCUs (which can include memory access controllers and configuration controllers as described herein).

In order to partition the array into sets of configurable units, configurable switches include a switch port disable register SPDR[0:7]. In one implementation, the SPDR register contains 1 bit for each north/south/east/west port in each direction; bit assignment is as follows.

- [0]: If set to '1', disable outbound transactions on the North port. Any outgoing transactions will be silently dropped. Otherwise, outbound transactions on the North port are enabled.
- [1]: If set to '1', disable inbound transactions on the North port. Any inbound transactions will be silently dropped. Otherwise, inbound transactions on the North port are enabled.
- [2]: If set to '1', disable outbound transactions on the South port. Any outgoing transactions will be silently dropped. Otherwise, outbound transactions on the South port are enabled.
- [3]: If set to '1', disable inbound transactions on the South port. Any inbound transactions will be silently dropped. Otherwise, inbound transactions on the South port are enabled.
- [4]: If set to '1', disable outbound transactions on the East port. Any outgoing transactions will be silently dropped. Otherwise, outbound transactions on the East port are enabled.
- [5]: If set to '1', disable inbound transactions on the East port. Any inbound transactions will be silently dropped. Otherwise, inbound transactions on the East port are enabled.
- [6]: If set to '1', disable outbound transactions on the West port. Any outgoing transactions will be silently dropped. Otherwise, outbound transactions on the West port are enabled.
- [7]: If set to '1', disable inbound transactions on the West port. Any inbound transactions will be silently dropped. Otherwise, inbound transactions on the West port are enabled.

This design could be simplified by having a single bit per port direction, if individual inbound and outbound port controls are unnecessary. Also, a smaller number of predefined configurations might be indicated in a configuration register using even fewer bits.

Configurable switches in the grid include configuration data stores 1220 (e.g. serial chains that can include a port disable register) to store unit files comprising a plurality of chunks (or sub-files of other sizes) of configuration data particular to the corresponding switch. The configuration data store 1220 is connected to circuitry 1205 via line 1221. Also, the configurable switches in the grid each include a unit configuration load logic 1240 connected to the configuration data store 1220 via line 1222. The unit configuration load logic 1240 executes a unit configuration load process. The unit configuration load process includes receiving via the bus system (e.g. the vector inputs), chunks of a unified particular to the configurable switch, and loading the received chunks into the configuration data store 1220 of the configurable switch. Unit configuration load process is further described with reference to FIG. 15.

The configuration data stores in the configurable switches in the grid in this example comprise serial chains of latches, where the latches store bits that control configuration of the resources in the switch. A serial chain in a configuration data store can include a first shift register chain for configuration data, such as port enable and disable parameters, and a second shift register chain for state information and counter values connected in series.

Each port in the configurable switch can interface with the scalar, vector and control buses using three corresponding sets of inputs and outputs. Also, the configurable switch can interface with the scalar, vector and control buses for communications directed to the switch, including for example for communications associated with configuration load and unload processes.

Although not shown, each of the ports can include FIFO buffers and other resources to support packet-based and/or route based communication in the grid of switches.

In this embodiment, the configuration load and unload process uses a daisy-chained completion bus to indicate when a load/unload command to configure the configurable switches in the grid completes. As shown in the example of FIG. 12, a daisy-chained completion bus 1291 and a daisy-chained command bus 1292 are connected to daisy-chained logic 1293. The daisy-chained logic 1293 communicates with unit configuration load logic 1240. The daisy-chained logic 1293 can include load complete status logic as described below. The daisy-chained completion bus is further described below. Control inputs are received by control block 1270, and control outputs are provided by the control block 1270. Other topologies for the command and completion buses are possible but not described here.

Figure 13:
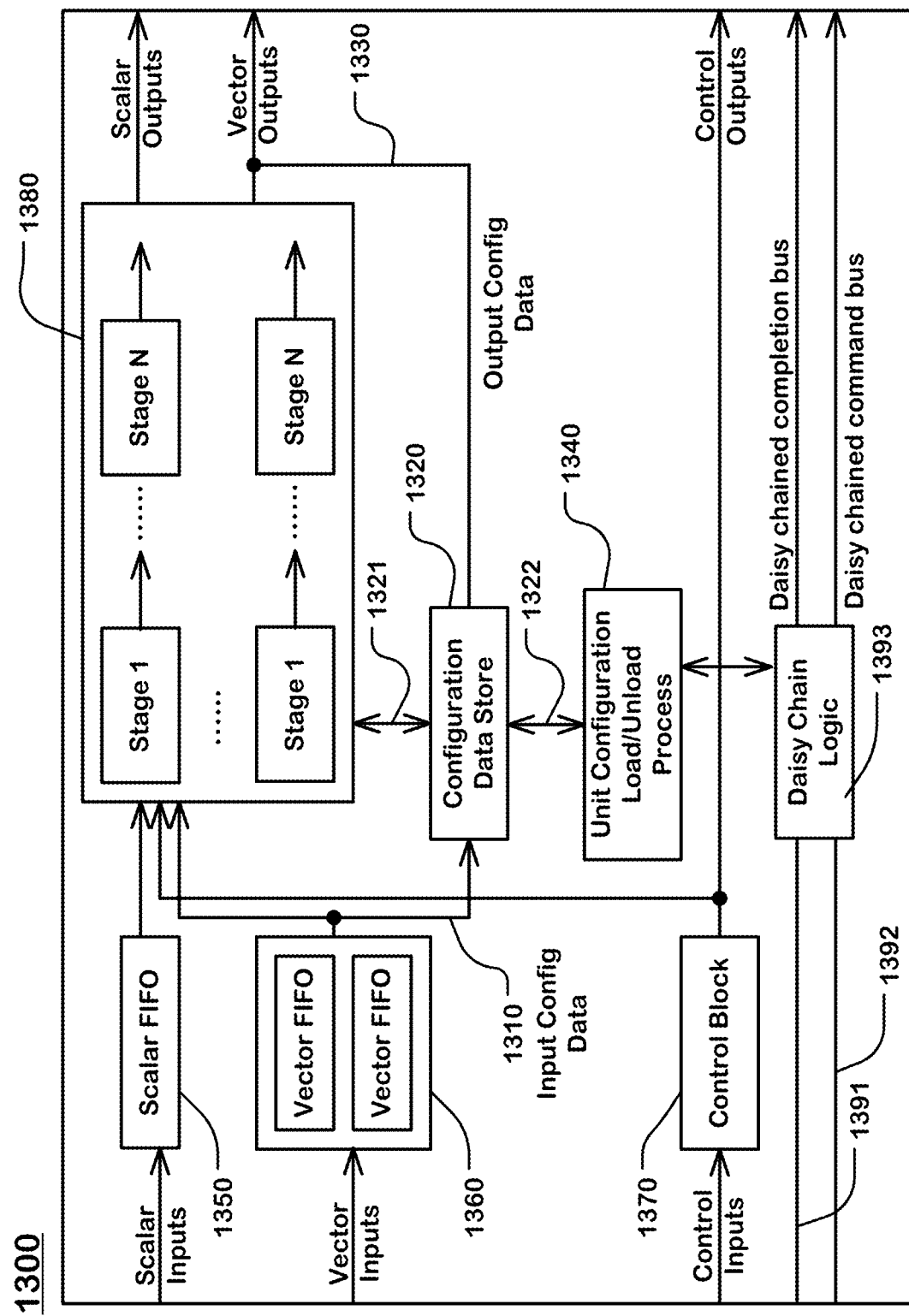
FIG. 13 is a block diagram illustrating an example configurable unit.

FIG. 13 is a block diagram illustrating an example configurable unit 1300, such as a Pattern Compute Unit (PCU). Configurable units in the array of configurable units include configuration data stores 1320 (e.g. serial chains) to store unit files comprising a plurality of chunks (or sub-files of other sizes) of configuration data particular to the corresponding configurable units. Configurable units in the array of configurable units each include unit configuration load logic 1340 connected to the configuration data store 1320 via line 1322, to execute a unit configuration load process. The unit configuration load process includes receiving via the bus system (e.g. the vector inputs), chunks of a unit file particular to the configurable unit, and loading the received chunks into the configuration data store 1320 of the configurable unit. The unit configuration load process is further described in reference to FIG. 14.

The configuration data stores in configurable units in the plurality of configurable units in this example comprise serial chains of latches, where the latches store bits that control configuration of the resources in the configurable unit. A serial chain in a configuration data store can include a first shift register chain for configuration data and a second shift register chain for state information and counter values connected in series. A configuration store is further described in reference to FIG. 15.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 1370, and control outputs are provided by the control block 1370.

Each vector input is buffered using a vector FIFO in a vector FIFO block 1360 which can include one or more vector FIFOs. Each scalar input is buffered using a scalar FIFO 1350. Using input FIFOs decouples timing between data producers and consumers, and simplifies inter-configurable-unit control logic by making it robust to input delay mismatches.

Input configuration data 1310 can be provided to a vector FIFO as vector inputs, and then be transferred to the configuration data store 1320. Output configuration data 1330 can be unloaded from the configuration data store 1320 using the vector outputs.

The CGRA uses a daisy-chained completion bus to indicate when a load/unload command has been completed. The master AGCU transmits the program load and unload commands to configurable units in the array of configurable units (to transition from S0 to S1, FIG. 14) over a daisy-chained command bus. As shown in the example of FIG. 13, a daisy-chained completion bus 1391 and a daisy-chained command bus 1392 are connected to daisy-chain logic 1393, which communicates with the unit configuration load logic 1340. The daisy-chain logic 1393 can include load complete status logic, as described below. The daisy-chained completion bus is further described below. Other topologies for the command and completion buses are clearly possible but not described here.

A configurable unit includes multiple reconfigurable datapaths in block 1380. A datapath in a configurable unit can be organized as a multi-stage (Stage 1 . . . Stage N), reconfigurable SIMD (Single Instruction, Multiple Data) pipe line. The chunks of data pushed into the configuration serial chain in a configurable unit include configuration data for each stage of each datapath in the configurable unit. The configuration serial chain in the configuration data store 1320 is connected to the multiple datapaths in block 1380 via lines 1321.

A Pattern Memory Unit (e.g. PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU.

Figure 14:
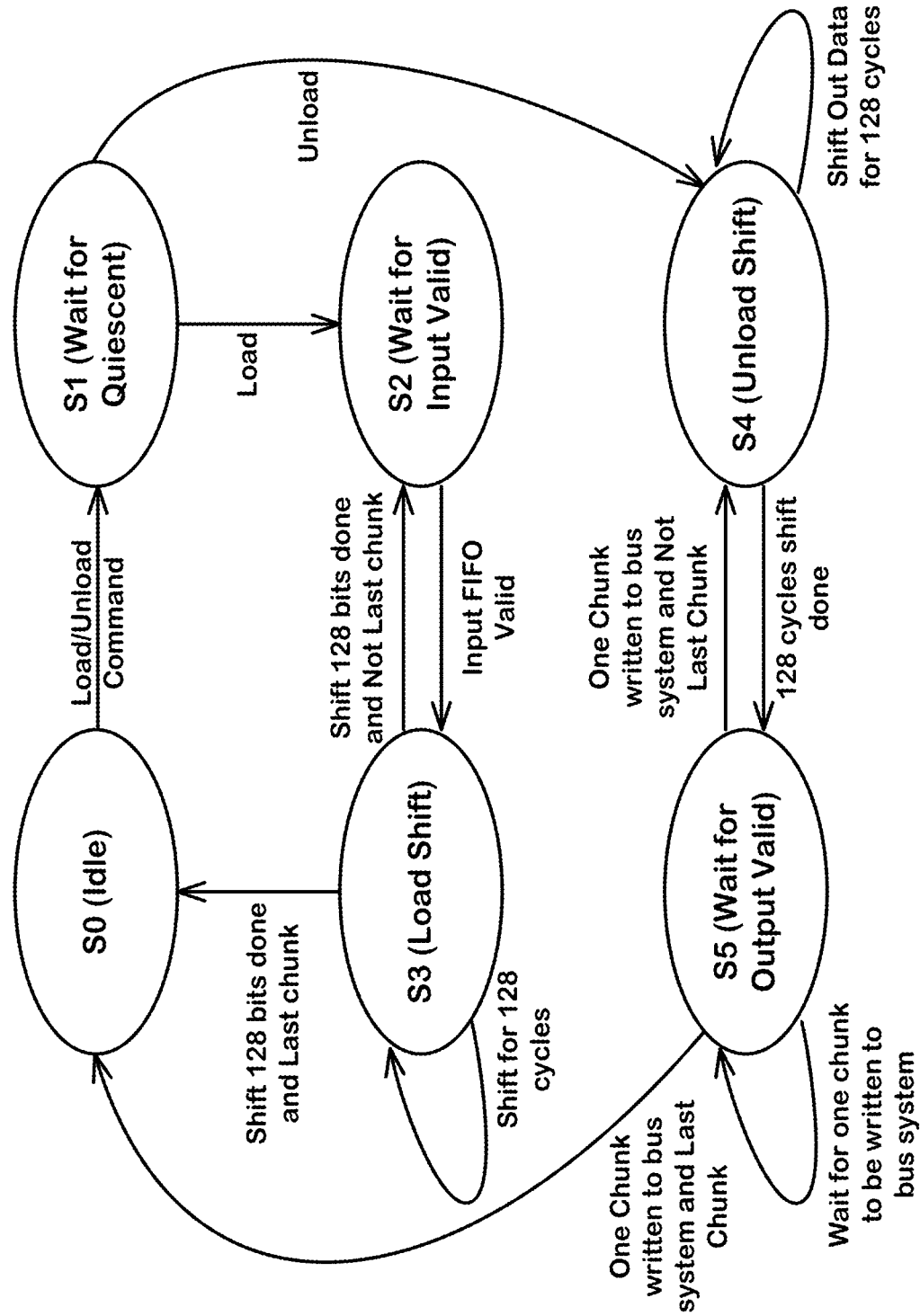
FIG. 14 illustrates one example of a state machine diagram that can be used to control a unit configuration load process in a configurable unit.

FIG. 14 illustrates one example of a state machine that can be used to control a unit configuration load process in a configurable unit. In general, a unit configuration load process receives a first chunk (or sub-file) of the unit file particular to the configurable unit from the bus system in one bus cycle, begins pushing the received first chunk into the serial chain during subsequent shifter cycles which occur at the same rate as the bus cycles, before a second chunk of the unit file is received. Upon receiving the second chunk of the unit file particular to the configurable unit from the bus system in a later bus cycle, the process begins pushing the received second chunk into the serial chain during cycles after pushing earlier received chunks into the serial chain. In some or all rounds of the configuration load process, a first chunk can be consumed by the unit configuration load process in the configurable unit before the second chunk (next in the order of chunks of the unit file) in the plurality of ordered chunks is received by the configurable unit.

The state machine of FIG. 14 includes six states S0 to S5. At State S0 (idle), the unit configuration load process waits for a configuration load/unload command from a configuration load/unload controller in a master AGCU. A configuration load/unload controller is responsible for loading and unloading of configuration data from/to the off-chip memory (140, FIG. 1) and to/from an array (190, FIG. 1) of configurable units. When a load command is received at the configuration load/unload controller, the unit configuration load process enters State S1.

At State S1 (wait for quiescent), functional flops in multiple datapaths are disabled so the functional flops are not cycling, and scalar outputs, vector outputs and control outputs are turned off so the outputs are not driving any loads. If a load command has been received, then the unit configuration load process enters State S2. When an unload command is received, the unit configuration load process enters State S4.

At State S2 (wait for input valid), the unit configuration load process waits for an input FIFO (1510, FIG. 15) to become valid. When the input FIFO becomes valid, the input FIFO has received a chunk of configuration data of the configuration file via the bus system. For instance, a chunk of configuration data can include 128 bits of load data, which is received on the vector network of the bus system and the vector network has the vector bus width of 128 bits. When the input FIFO becomes valid, the unit configuration load process enters State S3.

At State S3 (load shift), a chunk of configuration data of 128 bits is first de-queued in one clock cycle from the input FIFO, and then the chunk of configuration data of 128 bits is shifted into an input shift register (1520, FIG. 15) in 128 clock cycles. The input shift register can have the same length (e.g. 128 bits) as a chunk of configuration data, and it takes the same number of shifter clock cycles (e.g. 128) to shift the chunk of configuration data into the input shift register as the length of the chunk of configuration data. As mentioned above, the shifter clock and the bus clock (or bus cycles) can run at the same rate in some embodiments.

A configuration data store in a configurable unit comprises a configuration serial chain (1530, 1540, FIG. 15), which can be configured as a FIFO chain, to store a unit file comprising a plurality of chunks of configuration data particular to the configurable unit. The plurality of chunks of configuration data includes a first chunk of configuration data and a last chunk of configuration data. A chunk of configuration data in the input shift register is further serially shifted into the configuration data store in subsequent clock cycles. A configuration data store is further described in reference to FIG. 15.

After a first chunk of the unit file particular to the configurable unit is shifted into the input shift register at State S3, the unit configuration load process determines whether the first chunk of configuration data is the last chunk of configuration data particular to the configurable unit. If so, loading of the unit file for the configurable unit is complete, and the unit configuration load process enters State S0. If not, the unit configuration load process enters State S2, and waits for the input FIFO to become valid for a second chunk of configuration data particular to the configurable unit.

When an unload command is received in State S1, the unit configuration load process enters State S4.

Figure 15:
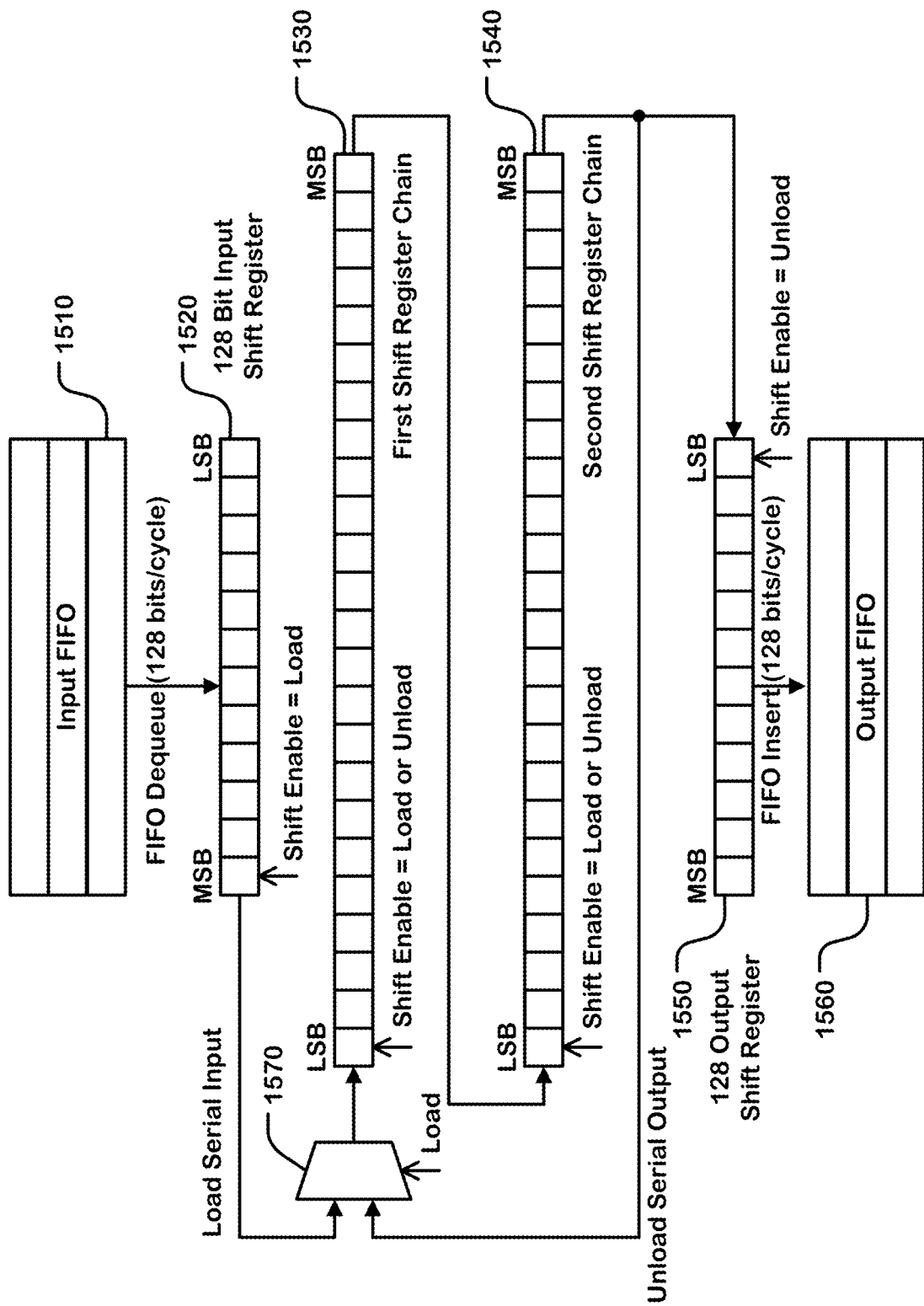
FIG. 15 is a logical representation of a structure supporting load of a configuration store in a configurable unit.

At State S4 (unload shift), a chunk of configuration data from the configuration data store is shifted into an output shift register (1550, FIG. 15). A chunk of configuration data can include 128 bits of unload data. The output shift register can have the same length (e.g. 128) as a chunk of configuration data, and it takes the same number of shifter clock cycles (e.g. 128) to shift the chunk of configuration data from the configuration data store into the output FIFO as the length of the chunk of configuration data. When the chunk of configuration data is shifted into the output shift register, the unit configuration load process enters State S5 (wait for output valid).

At State S5 (wait for output valid), the unit configuration load process waits for an output FIFO (1560, FIG. 15) to become valid. When the output FIFO becomes valid, the chunk of configuration data having 128 bits from the output shift register is inserted into the output FIFO in one clock cycle. The chunk of configuration data in the output FIFO can then be sent to the bus system (FIG. 3).

After a first chunk of configuration data is shifted into the output FIFO at State S5, the unit configuration load process determines whether the first chunk of configuration data is the last chunk of configuration data in the configuration data store. If so, unloading of configuration data for the configurable unit is complete, and the unit configuration load process enters State S0. If not, the unit configuration load process enters State S4, and a second chunk of configuration data from the configuration data store is serially shifted into the output shift register.

FIG. 15 is a logical representation of a configuration store in a configurable unit. A configuration data store (420, FIG. 4) in a configurable unit comprises a configuration serial chain in this embodiment, including a first shift register chain 1530 and a second shift register chain 1540. The first shift register chain 1530 includes a set of registers or latches. The second shift register chain 1540 includes another set of registers or latches (flip-flops). The first shift register chain and the second shift register chain are connected in series to form a single chain in this embodiment.

A configuration file includes a plurality of chunks of configuration data for each configurable unit in a plurality of configurable units in an array of configurable units. The chunks of configuration data represent the initial configuration, or starting state, of respective configurable units. A configuration load operation in this system is the process of setting up the unit files of configuration data in an array of configurable units to allow all the configurable units to execute a program.

The set of registers in the first shift register chain 1530 can represent either the setup or the sequence to run a program, including a definition of the operation of the configurable units containing the registers. These registers can register the number of nested loops, the limits of each loop iterator, the instructions to be executed for each stage, the source of the operands, and the network parameters for the input and output interfaces. The set of registers in the second shift register chain can contain data about cycle-by-cycle running state of a program loaded in a configurable unit.

As shown in the example of FIG. 15, the first shift register chain 1530 and the second shift register chain 1540 are connected in series, so that the MSB (most significant bit) of the first shift register chain is connected to the LSB (least significant bit) of the second shift register chain. A load signal or an unload signal can act as a shift enable signal coupled to the LSB of the first shift register chain and the LSB of the second shift register chain, to control a load/unload operation on the first shift register chain and the second shift register chain. Input FIFO 1510 is coupled to the input shift register 1520 via a selector 1570. The selector 1570 connects the input shift register 1520 to the input of the configuration data store (LSB of the first shift register chain 1530), when the load signal is active.

When a load signal is active, configuration data in the input shift register 1520 can be shifted into the first shift register chain 1530 and the second shift register chain 1540 in the configuration serial chain. Here the load signal can act as an enable signal for the input shift register, the first shift register chain, and the second shift register chain. The load operation can repeat until all chunks of configuration data for a configurable unit are loaded into the configuration data store in the configurable unit. When the length of the serial chain is different than the length of an integer number of chunks (or sub-files), the first chunk in the series can be padded with the difference, and the pad bits will be shifted out to the end of the chain when the last chunk is shifted in. For example, a configuration data store in a configurable unit can store a unit file having a size of 760 bits. The unit configuration load process can load an integer number N of chunks. In this example, N=6, and the number N of chunks include Chunk 5, Chunk 4, Chunk 3, Chunk 2, Chunk 1 and Chunk 0. A vector bus has a vector width of 128 bits, a chunk of configuration data has 128 bits, and a chunk can be sent to a configurable unit in one bus clock cycle. The N chunks have a size of N×128=6*128=768 bits, which includes 8 pad bits to match the unit file size of 760 bits.

In order to recover from errors, an unload operation can checkpoint the state of each configurable unit. The unload operation can save the execution state of each configurable unit that is needed for restart, and enable the application graph to be restarted if an error occurs. It also allows the state of configurable units to be saved or transferred for debug purposes. The state that needs to be saved includes at least the contents of part the first or second shift registers, and optionally contents of the PMU memories. Program unload may also require unloading the state of all of the first and second shift registers.

Output FIFO 1560 is coupled to the output shift register 1550, which in turn is coupled to the output of the configuration data store (MSB of the second shift register chain 1540). For an unload operation, when an unload signal is active, the configuration data in the second shift register chain 1540 and the first shift register chain 1530 can be shifted into the output shift register 1550. When the output FIFO 1560 is valid, the configuration data (e.g. 128 bits) in the output shift register 1550 can be inserted into the output FIFO 1560 in one clock cycle. The unload operation can repeat until all chunks of configuration data in a configuration data store in a configurable unit are unloaded into the output FIFO.

In order to synchronize and communicate the completion of configuration load commands issued by the configuration load controller in a MAGCU, a single wire daisy-chained scheme is implemented in one example, supported by logic included in daisy-chain logic (e.g., daisy-chain logic 1393 in FIG. 13) in each component of the chain. This scheme requires every component to have the following 2 ports:
1. Input port called PROGRAM_LOAD_DONE_IN
2. Output port called PROGRAM_LOAD_DONE_OUT A component will drive its PROGRAM_LOAD_DONE_OUT signal when it has completed executing the command issued by MAGCU and its PROGRAM_LOAD_DONE_IN input is driven high. MAGCU will initiate the daisy-chain by driving its PROGRAM_LOAD_DONE_OUT when it has completed all necessary steps for executing a command. The last component in the chain will drive its PROGRAM_LOAD_DONE_OUT which will be connected to PROGRAM_LOAD_DONE_IN of MAGCU. PROGRAM_LOAD_DONE_IN of MAGCU going high indicates the completion of a command. After delivering the data corresponding to all CHUNKS of all components, MAGCU drives its PROGRAM_LOAD_DONE_OUT port high. All components will drive their respective PROGRAM_LOAD_DONE_OUT ports high when they have completed loading all their configuration bits.

When MAGCUs input port PROGRAM_LOAD_DONE_IN is asserted, the configuration file load is complete.

Figure 16:
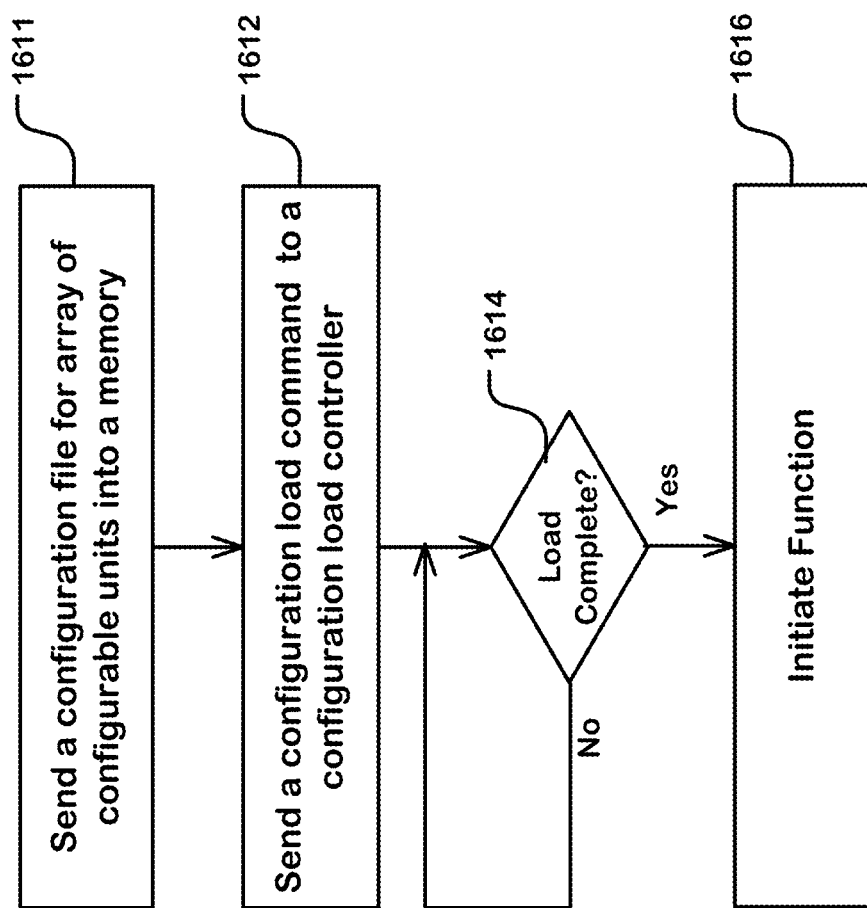
FIG. 16 is a flowchart illustrating operations of a host coupled to a reconfigurable data processor.

FIG. 16 is a flowchart illustrating operations of a host coupled to a reconfigurable data processor. At Step 1611, a host (120, FIG. 1) sends a configuration file for an array of configurable units to an off-chip memory (140, FIG. 1) via a PCIE interface (130, FIG. 1) and a top level network (115, FIG. 1), or otherwise stores the configuration file in memory accessible to the configurable processor.

At Step 1612, when loading the configuration file to the memory is completed, the host 120 sends a configuration load command to a configuration load controller in the processor (part of a master AGCU in this example). The master AGCU can implement a register through which the host can send a configuration load command to the configuration load controller. The configuration load command can identify a location in memory accessible via a memory interface on the configurable processor that specifies a location of the configuration file. The configuration load controller can then generate one or more memory access requests via the top level network in response to the command to retrieve the configuration file. The host can then monitor the configurable processor for a signal that the configuration file has been completely loaded (1614). When the file loading is complete, then the host can initiate the function to be executed by the machine (1616).

Figure 17:
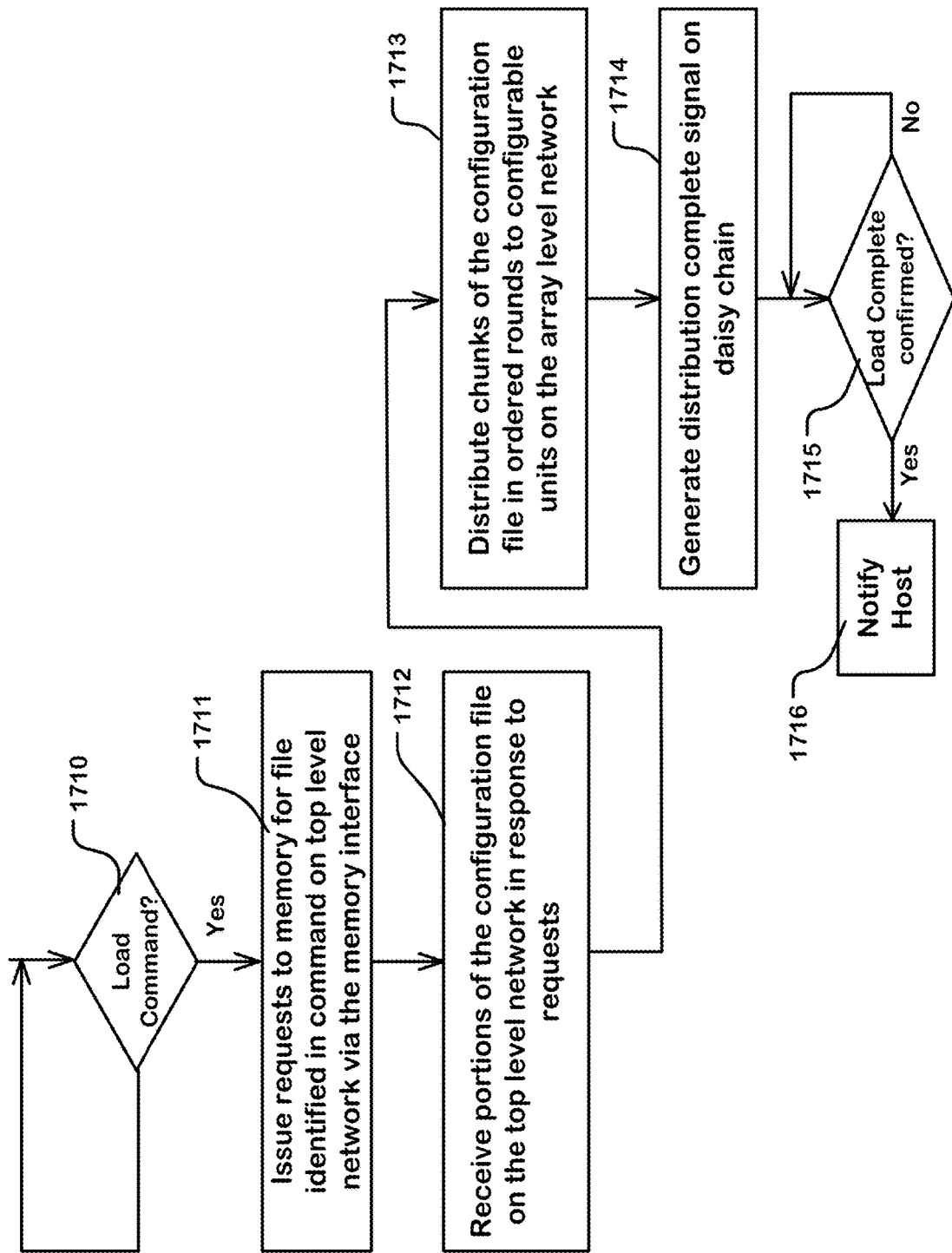
FIG. 17 is a flowchart illustrating operations of the configuration load controller, which can be part of a master AGCU or otherwise in communication with the array of configurable units in a tile.

FIG. 17 is a flowchart illustrating operations of the configuration load controller, which can be part of a MAGCU or otherwise in communication with the array of configurable units in a tile. The configuration load controller is responsible for reading the configuration file from the off-chip memory (140, FIG. 1) and sending the configuration data to every configurable unit in an array of configurable units. This flow chart begins with the configuration load controller waiting for a configuration load command (1710). As mentioned above, the configuration load command identifies a configuration file, and its location in memory accessible to the processor.

Upon receiving a load command, at Step 1711, the configuration load controller issues load requests to the memory (140, FIG. 1) connected to the reconfigurable data processor (110, FIG. 1). At Step 1712, the configuration load controller retrieves chunks of the configuration file on the top level network via the memory interface. At Step 1713, the configuration load controller distributes chunks of the configuration file in ordered rounds to the configurable units in the array on the array level network. When all the chunks of the configuration file have been received and distributed, the configuration load controller generates a distribution complete signal (e.g. its PROGRAM_LOAD_DONE_OUT) at step 1714. The configuration load controller then waits for confirmation from the configurable units that their respective unit files have been loaded, indicated for example by assertion of its PROGRAM_LOAD_DONE_IN at step 1715. Upon confirmation of successful configuration load, the configuration load controller can notify the host (1716).

FIG. 18 illustrates one example organization of a configuration file. Other organizations can be used as well arranged as suits a particular protocol for loading and unloading configuration files. In the example described with reference to FIG. 9, configurable units in an array of configurable units include the Switch, PCU, PMU, and AGCU. Each of these configurable units contains a set of registers that represent either the setup or the sequence to run a program. These registers include data to define the operation of the configurable unit containing it, such as the number of nested loops, the limits of each loop iterator, the instructions to be executed for each stage, the source of the operands, and the network parameters for the input and output interfaces. Additionally, each the configuration files can include data to set context in a set of counters that track its progress in each nested loop.

A program executable contains a bit-stream representing the initial configuration, or starting state, of each of the configurable units that execute the program. This bit-stream is referred to as a bit file, or herein as a configuration file. Program load is the process of setting up the configuration stores in the configurable units based on the contents of the configuration file to allow all the configurable units to execute a program. Program unload is the process of unloading the configuration stores from the configurable units, and assembling a bit-stream, called herein an unload configuration file. The unload configuration file has, in examples described herein, the same arrangement chunks or sub-files and the configuration file used for program load.

The configuration file includes a plurality of chunks of configuration data for each configurable unit in an array of configurable units, the chunks being arranged in the configuration file in a fashion that matches the sequence in which they are to be distributed. This organization of the configuration file enables the array configuration load process to route the chunks to configurable units based on locations of the chunks in the configuration file.

As illustrated in FIG. 18, the configuration file (and the unload configuration file arranged in the same manner) includes a plurality of chunks of unit files for each configurable unit in a plurality of configurable units, the unit files having up to M (Z4=6 in this example) sub-files having an order (i) in the unit file. In FIG. 9, M is six, and the chunks are ordered from first to sixth (i.e. the first through the sixth chunks correspond with chunks (0) to (5) in this indexing). The chunks are arranged so that all sub-files of order (i) for (i) going from 0 to M−1, for all the unit files in the load or unload configuration file are stored in a corresponding block (i) of address space in the memory, for (i) going from 0 to M−1. The chunks of order (0) are stored in block (0) including addresses A0 to A1-1. The chunks of order (0) for switch units in this example are in a group of contiguous addresses within block (0). The chunks of order (0) for PCUs are in a group of contiguous addresses within block (0). The chunks of order (0) for PMUs are in a group of contiguous addresses within block (0). The chunks of order (0) for AGCUs are in a group of contiguous addresses. The chunks of order (1) are stored in block (1) including addresses A1 to A2-1. The chunks of order (1) for switch units in this example are stored in a group of contiguous addresses within block (1). The chunks of order (1) for PCUs are in group of contiguous addresses within block (1). The chunks of order (1) for PMUs are in group of contiguous addresses within block (1). The chunks of order (1) for AGCUs are in group of contiguous addresses within block (1). The chunks of orders 3 to 5 are arranged as seen in FIG. 9, following the pattern in blocks (2) to (5).

As seen, the linear address space is allocated within the blocks for a configuration file on line boundaries in this example. In other embodiments, the linear address space can be allocated on word boundaries or chunk boundaries. The boundaries can be chosen to match efficiency characteristics of the memory be used. Thus, the configuration file in this example comprises lines of the memory with sequential line addresses.

Also, the array includes more than one type of configurable unit, and the unit files for different types of configurable units include different numbers of sub-files of configuration data, and wherein within a block (i) of address space, the sub-files for each type of configurable unit are stored in a corresponding group of contiguous addresses within the block (i) of address space.

The array can include more than one type of configurable unit, and the unit files for different types of configurable units can include different numbers of chunks of configuration data. For instance, as shown in FIG. 3, types of configurable units in the array can include Switch Units, PCU (Pattern Compute Units), PMU (Pattern Memory Units) and AGCU (Address Generation and Coalescing Units).

An example configuration file organization includes:
W (e.g. 28 in FIG. 3) Switch units, each unit requiring Z1 chunks of configuration bits;
X (e.g. 9) PCU units, each unit requiring Z2 chunks of configuration bits;
Y (e.g. 9) PMU units, each unit requiring Z3 chunks of configuration bits;
Z (e.g. 4) AGCU units, each unit requiring Z4 chunks of configuration bits.

Thus, the unit files for a first type of configurable unit can include Z1 chunks, and the unit files for a second type of configurable unit include Z2 chunks, where Z1 is less than Z2. The array configuration load process can include retrieving segments of the configuration file including chunk (i) of the unit files for all of the configurable units of the first type and the second type, in Z1 rounds for (i) going from 0 to Z1-1, and then retrieving segments of the configuration file including chunk (i) of the unit files for all of the configurable units of the second type, in Z2 rounds for (i) going from Z1 to Z2-1. The unit files for a third type of configurable unit can include Z3 chunks, and the unit files for a fourth type of configurable unit include Z4 chunks, where Z1 is less than Z2, Z2 is less than Z3, and Z3 is less than Z4. The distribution sequence can continue in this mode with one round for each chunk (i) for all the different types of configurable units that require more than (i+1) chunks.

As shown in the example configuration file organization, chunks of configuration data in a configuration file are arranged in an interleaved fashion:
the first of 2 chunks of configuration bits for each of the switch units for round R(i=0);
the first of 3 chunks of configuration bits for each of the PCU units for round R(i=0);
the first of 5 chunks of configuration bits for each of the PMU units for round R(i=0);
the first of 6 chunks of configuration bits for each of the AGCU units for round R(i=0);
the second of 2 chunks of configuration bits for each of the switch units for round R(i=1);
the second of 3 chunks of configuration bits for each of the PCU units for round R(i=1);
the second of 5 chunks of configuration bits for each of the PMU units for round R(i=1);
the second of 6 chunks of configuration bits for each of the AGCU units for round R(i=1);
the third of 3 chunks of configuration bits for each of the PCU units for round R(i=2);
the third of 5 chunks of configuration bits for each of the PMU units for round R(i=2);
the third of 6 chunks of configuration bits for each of the AGCU units for round R(i=2);
the fourth of 5 chunks of configuration bits for each of the PMU units for round R(i=3);
the fourth of 6 chunks of configuration bits for each of the AGCU units for round R(i=3);
the fifth of 5 chunks of configuration bits for each of the PMU units for round R(i=3);
the fifth of 6 chunks of configuration bits for each of the AGCU units for round R(i=4);
the sixth of 6 chunks of configuration bits for each of the 4 AGCU units for round R(i=5).

The unit files can be organized to comprise a plurality of ordered chunks (or other sized sub-files). The unit files particular to different configurable units may have different numbers of ordered chunks in some embodiments. The configuration file for an array of configurable units is arranged so that chunks of the unit files are grouped with chunks of the same order for other unit files. Also, the configuration file is arranged so that location of a chunk in the configuration file implies the configurable unit in the array of the chunk and its order in the unit file particular to the configurable unit.

The array configuration load process can retrieve segments of the configuration file including chunk (i) of the unit files for all of the configurable units of the first type (Switch type), the second type (PCU type), the third type (PMU type) and the fourth type (AGCU type), for (i) going from 0 to Z1-1(=1). The chunks (0) of the unit files for all of the configurable units of the four types are retrieved in a first round, and the chunks (1) of the unit files for all of the configurable units of the four types are retrieved in a second round. After the first and second rounds, all (2) chunks of the unit files for all of the configurable units of the first type (Switch type) have been retrieved. The unit files for all of the configurable units of the first, second, third and fourth types have 0, 1, 3 and 4 chunks remaining to be retrieved, respectively.

The array configuration load process can then retrieve segments of the configuration file including chunk (i) of the unit files for all of the configurable units of the second, third and fourth types in a third round. After the third round, all (3) chunks of the unit files for all of the configurable units of the second type (PCU type) have been retrieved. The unit files for all of the configurable units of the first, second, third and fourth types have 0, 0, 2 and 3 chunks remaining to be retrieved, respectively.

The array configuration load process can then retrieve segments of the configuration file including chunk (i) of the unit files for all of the configurable units of the third and fourth types in a fourth round. After the fourth round, all (4) chunks of the unit files for all of the configurable units of the third type (PMU type) have been retrieved. The unit files for all of the configurable units of the first, second, third and fourth types have 0, 0, 1 and 2 chunks remaining to be retrieved, respectively.

The array configuration load process can then retrieve segments of the configuration file including chunk (i) of the unit files for all of the configurable units of the third and fourth types, for (i) going from Z3(=4) to Z4-1(5), in fifth and sixth rounds. After the sixth round, all (6) chunks of the unit files for all of the configurable units of the fourth type (AGCU type) have been retrieved. The unit files for all of the configurable units of the first, second, third and fourth types have 0, 0, 0 and 0 chunks remaining to be retrieved, respectively.

In the manner described above, the array configuration load process can continue until the unit files for all of the configurable units of the first, second, third and fourth types have no chunks remaining to be retrieved.

The array configuration load process routes chunks of the configuration data to configurable units via the array level network using addresses implied by location of the chunks in the configuration file. For instance, the first of 2 chunks of the configuration data for each of the 198 switch units has linear memory addresses 0-12288, and the second of 2 chunks of the configuration data for each of the 198 switch units has linear memory addresses 33792-46080.

In some embodiments, the chunks of the configuration file may be returned out of order to the configuration load controller from memory. The location of the chunks in the configuration file can be used to route the chunk to the correct configurable unit. Because of the organization of the rounds in the distribution sequence, the configurable units are guaranteed to receive the chunks of their unit files in order.

Figure 19:
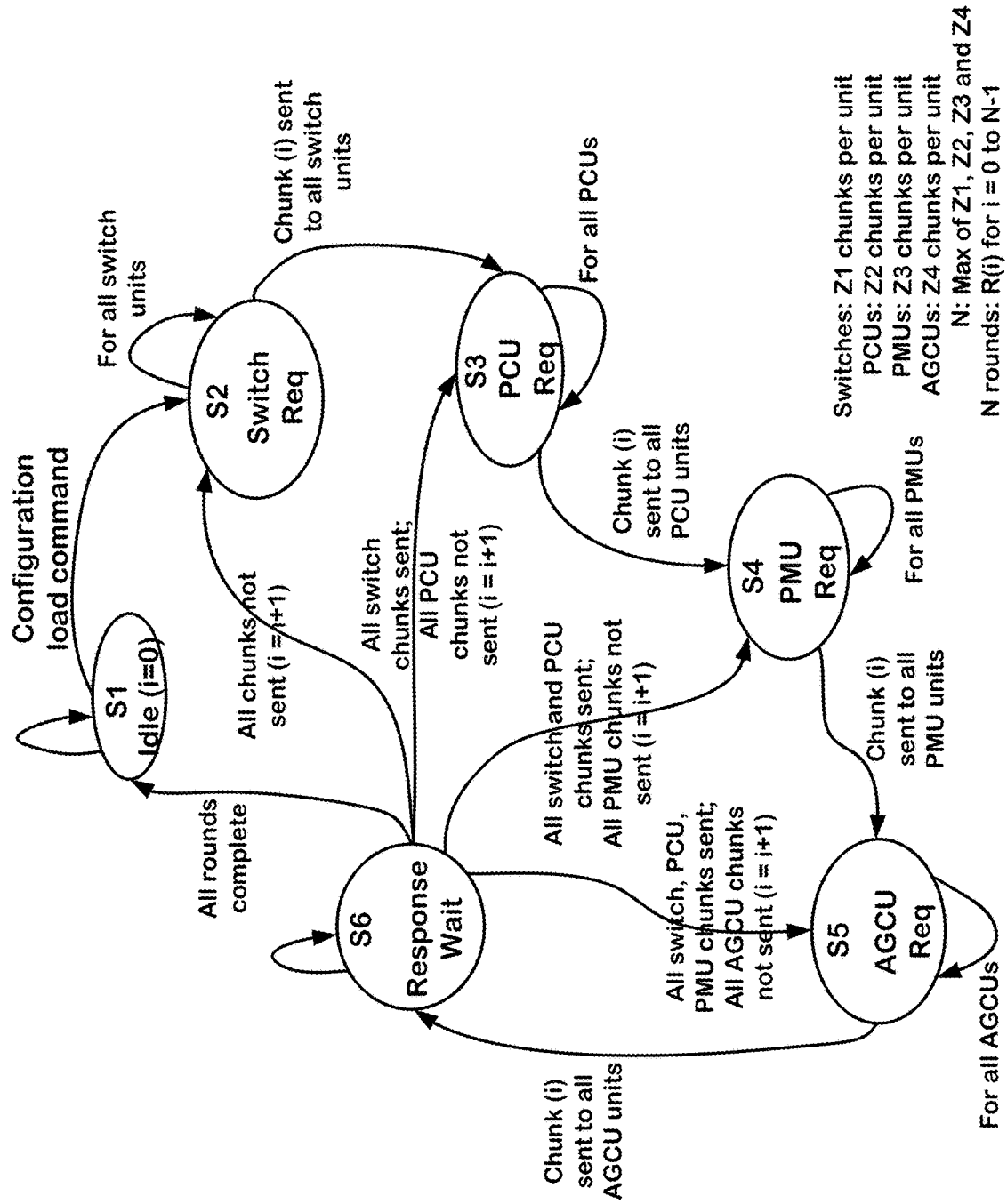
FIG. 19 is a state machine diagram illustrating one example of logic to execute an array configuration load process for a system like that of FIGS. 2 and 3.

FIG. 19 is a state machine diagram illustrating one example of logic to execute an array configuration load process for a system like that of FIGS. 2 and 3, including distributing a configuration file comprising unit files for a plurality of the configurable units in the array, the unit files each comprising a plurality of ordered chunks (or sub-files), by sending in a sequence of N rounds (R(i) for i=0 to N−1) one unit chunk of order (i) via the bus system to all of the configurable units including up to N sub-files in the plurality of configurable units, until the unit files in the configuration file are distributed to the configurable units in the plurality of configurable units.

In this example, the state machine includes six states S1 to S6. At State S1 (Idle), the configuration load controller waits for a configuration load command from the host. When a configuration load command is received, the load process enters State S2 to begin executing a first round R(0) of the distribution sequence. Each round traverses states S2 to S6. In the example described herein, there are six rounds because the maximum number of chunks to be distributed to a configurable unit in the array is six.

At State S2 (Switch Req), the configuration load controller generates memory access requests via the top level network to retrieve chunks for state S2 of round R(i) of the configuration unit files for respective switch units, and distributes the retrieved chunks to the respective switch units. For i=0, in round R(0), the configuration load controller generates memory access requests for the chunk (0) in the multiple chunks for respective switch units, and sends the chunks (0) to the respective switch units. For i=1, in round R(1), the configuration load controller generates memory access requests for chunk (1) in the multiple chunks for respective switch units, and sends the chunks to the respective switch units. In round R(i), when the configuration load controller has generated memory access requests for the chunks (i) in the multiple chunks for the respective switch units, and distributed the chunks for all the switch units, the load process enters State S3.

At State S3 (PCU Req), the configuration load controller generates memory access requests via the top level network to retrieve chunks for round R(i) of the configuration unit files for respective PCU units (Pattern Compute Units), and distributes the retrieved chunks to the respective PCU units. In state S3 of round R(i), the configuration load controller generates memory access requests for the chunks (i) in the multiple chunks for respective PCU units, and sends the chunks (i) to the respective PCU units. In round R(i), when the configuration load controller has generated memory access requests for chunk (i) in the multiple chunks for the respective PCU units and distributed the chunks, the load process enters State S4.

At State S4 (PMU Req), the configuration load controller generates memory access requests via the top level network to retrieve chunks of the configuration unit files for respective PMU units (Pattern Memory Units) in the array of configurable units, and sends the retrieved chunks to the respective PMU units. In state S4 of round R(i), the configuration load controller generates memory access requests for the chunks (i) in the multiple chunks for respective PMU units, and sends the chunks (i) to the respective PMU units. For instance, for i=0, in round R(0), the configuration load controller generates memory access requests for the chunks (0) in the multiple chunks for respective PMU units, and sends the chunks (0) to the respective PMU units. For i=1, in round R(1), the configuration load controller generates memory access requests for the chunks (1) in the multiple chunks for respective PMU units, and sends the chunks (1) to the respective PMU units. In round R(i), when the configuration load controller has generated memory access requests for the chunks (i) in the multiple chunks for the respective PMU units and distributed the chunks, the load process enters State S5.

At State S5 (AGCU Req), the configuration load controller generates memory access requests via the top level network to retrieve chunks of the configuration unit files for respective AGCUs (Address Generation and Coalescing Units) in the array of configurable units, and sends the retrieved chunks to the respective AGCU units. In State S5 of round R(i), the configuration load controller generates memory access requests for the chunks (i) in the multiple chunks for respective AGCU units, and sends the chunks (i) to the respective AGCU units. In state S5 of round R(i), when the configuration load controller has generated memory access requests for the chunks (i) in the multiple chunks for the respective AGCU units and distributed the chunks, the load process enters State S6 of round R(i).

At State S6 (Response Wait), the configuration load controller waits to ensure that configurable units (switch, PCU, PMU, AGCU units) in the array are ready to receive more chunks of configuration data in a next round. If all chunks for the switch units are not sent, the load process increments (i) and proceeds to State S2 to start the next round R(i+1). If all chunks for the switch units are sent but all chunks for the PCU chunks are not sent, the load process increments (i) and proceeds to State S3 to start the next round R(i+1). If all chunks for the switch units and the PCU units are sent but all chunks for the PMU chunks are not sent, the load process increments (i) and proceeds to State S4 to start the next round R(i+1). If all chunks for the switch units, the PCU units, and the PMU units are sent but all chunks for the AGCU chunks are not sent, the load process increments (i) and proceeds to State S5 to start the next round R(i+1). If all chunks for all configurable units (switch, PCU, PMU, AGCU units) are sent (i.e., all rounds complete), the load process proceeds to State S1.

Figure 20:
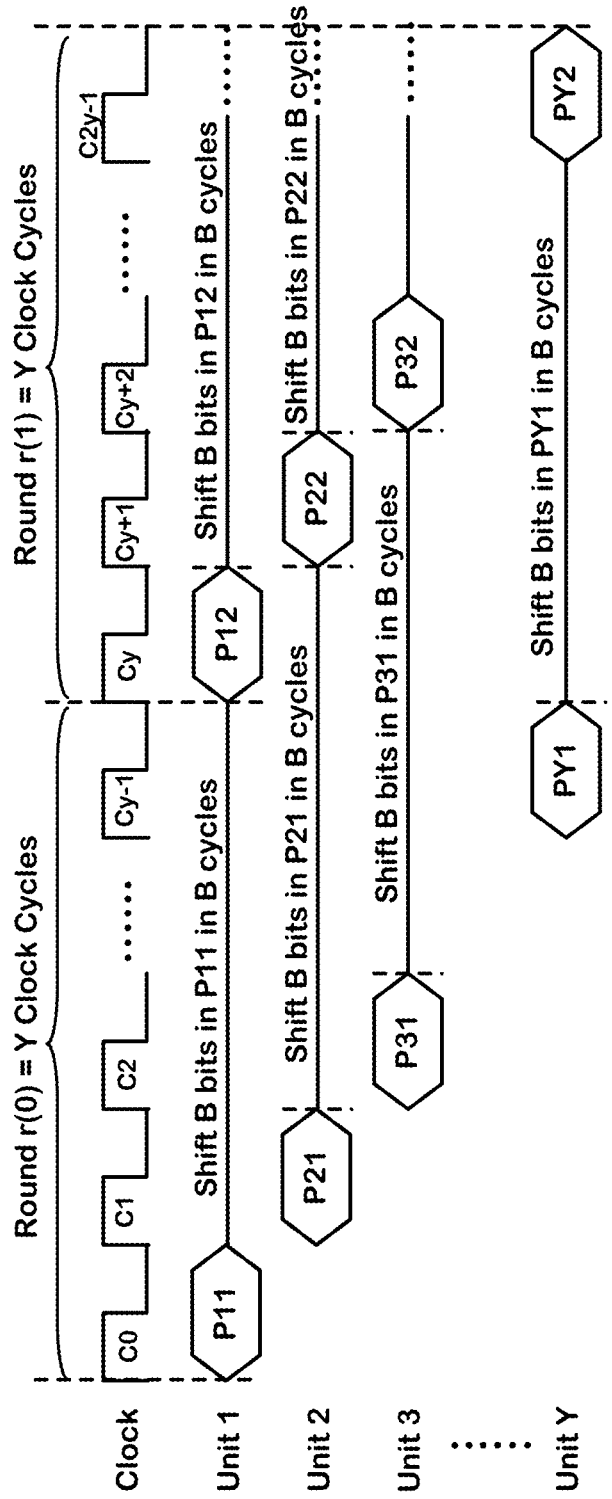
FIG. 20 is a timing diagram illustrating a timing of early rounds of a distribution sequence like that of FIG. 19.

FIG. 20 is a timing diagram illustrating a timing of early rounds of a distribution sequence like that of FIG. 10. In this example, a chunk of the configuration unit file has a number B of bits of data (e.g. B=128), a round in the distribution sequence can include a number X of configurable units, an array of configurable units can include a number Y of configurable units (e.g. Y=148). For round R(0), X can be equal to Y. In subsequent rounds, X can be less than or equal to Y.

In this example, round R(0) includes Y=148 configurable units. For rounds R(0) and R(1), X=Y. After the first two rounds R(0) and R(1), the switch units have received all (2) their chunks, so the third round R(2) includes fewer than 128 configurable units.

As shown in the example of FIG. 20, round R(0), a first chunk P11 of the configuration unit file is received at a configurable unit via the bus system in a first bus cycle C0. The first chunk is then loaded into the configuration store of a first configurable unit "Unit 1", by serially shifting in a parallel task at the configurable unit while other chunks of the round are distributed by the configuration load controller to other configurable units, B bits of data in the first chunk P11 in B clock cycles (which can run at the same rate as the bus clock). A second chunk P21 of the configuration file is received via the bus system in a second bus cycle C1. The second chunk is then loaded in a parallel task into the configuration store of a second configurable unit "Unit 2", by serially shifting B bits of data in the second chunk P21 in B clock cycles. A third chunk P31 of the configuration file is received via the bus system in a third bus cycle C2. The third chunk P31 is then loaded into the configuration store of a third configurable unit "Unit 3", by serially shifting B bits of data in the third chunk P31 in B clock cycles. This round proceeds until all the configurable units receive the first chunk of the unit file particular to them.

Round R(0) includes distributing a first set of Y chunks of the configuration file (P11, P21, P31 . . . PY1) in the Y respective configurable units (Unit 1 . . . Unit Y) in the array. A chunk of the configuration file has a number B of bits of data, and the array of configurable units has the number Y of configurable units. When round R(0) is completed, Y chunks of the configuration file (P11, P21, P31 . . . PY1) in the first set have been received in Y configurable units in the array in Y bus cycles (C0 to CY-1), and the first chunk P11 has been loaded or serially shifted into the configuration store of the first configurable unit "Unit 1" in B clock cycles. The B clock cycles are subsequent to the first clock cycle C0 in which the first chunk P11 is received.

The next round R(1) includes receiving a second set of Y chunks of the configuration file (P12, P22, P32 . . . Py2) in the Y respective configurable units in the array (Unit 1 . . . Unit Y). When round R(1) is completed, Y chunks of the configuration file (P12, P22, P32 . . . Py2) in the second set have been received in the Y respective configurable units in the array in Y clock cycles (Cy to C2y-1). When round R(1) is completed, the second chunk P12 for the first configurable unit "Unit 1" has been loaded or serially shifted into the configuration store of the first configurable unit "Unit 1" in B clock cycles subsequent to the first clock cycle (Cy) in round R(1). Also when the second round is completed, the last chunk PY1 in the first set of Y chunks of the configuration file received in round R(0) has been loaded or serially shifted into the configuration store of the last configurable unit "Unit Y".

As long as the number B (128) of bits in a chunk is less than the number X of configurable units in a round, the configurable unit will receive a next chunk of a unit configuration file after the previous chunk has been loaded so that the configurable units should be ready without requiring the sequence to stall. In this example, the number B of bits in a chunk is 128, and the number X of configurable units in round R(0) is X=Y=148. Since it takes 128 clock cycles to serially shift the 128 bits in a chunk into the configuration data store of a configurable unit, there can be effectively 20 (Y-B=148-128) buffer cycles after the shifting is done, ensuring that the first configurable unit "Unit 1" is ready to accept the next chunk (P12) in the next round R(1). When the number B of bits in a chunk is greater than the number X of configurable units in a round, a next chunk can be received while a previous chunk is being consumed. Here being consumed refers to serially shifting bits in a chunk into the configuration data store of a configurable unit.

Generally, the unit configuration load process receives a first chunk (or sub-file) of the unit file particular to the configurable unit from the bus system in one bus cycle, begins pushing the received first chunk into the serial chain during subsequent bus cycles before a second chunk of the unit file for a next round is received, receives the second chunk of the unit file particular to the configurable unit from the bus system for the next round of the sequence in a later bus cycle, and begins pushing the received second chunk into the serial chain during cycles of the sequence after pushing earlier received chunk into the serial chain. In some rounds, all of a received chunk can be consumed before the next chunk is received.

Since different types of configurable units may have a different number of configuration bits, the configurable units may require varying number of chunks. Once configurable units which require a fewer number of chunks have loaded all of their configuration bits, the configuration load controller stops sending data to them. This can result in fewer configurable units (the number X) interleaved and can lead to configurable units receiving new chunks before they are done processing the previous chunk. This can lead to back-pressure on the array level network.

The back-pressure can be handled via a credit mechanism on the array level network. For instance, each input FIFO can have a hop-to-hop credit, so if a PCU's input FIFO fills up, then no switch in the array network trying to send configuration data to that PCU's input FIFO can send data until the input FIFO empties one entry and returns a credit to the sending switch. Eventually, the back-pressure may stall the AGCU from sending data as links are busied. But, once the configurable unit consumes all 128 bits of a chunk, it empties one input FIFO entry, a credit is released, and then the sender can send a new chunk if available.

Figure 21:
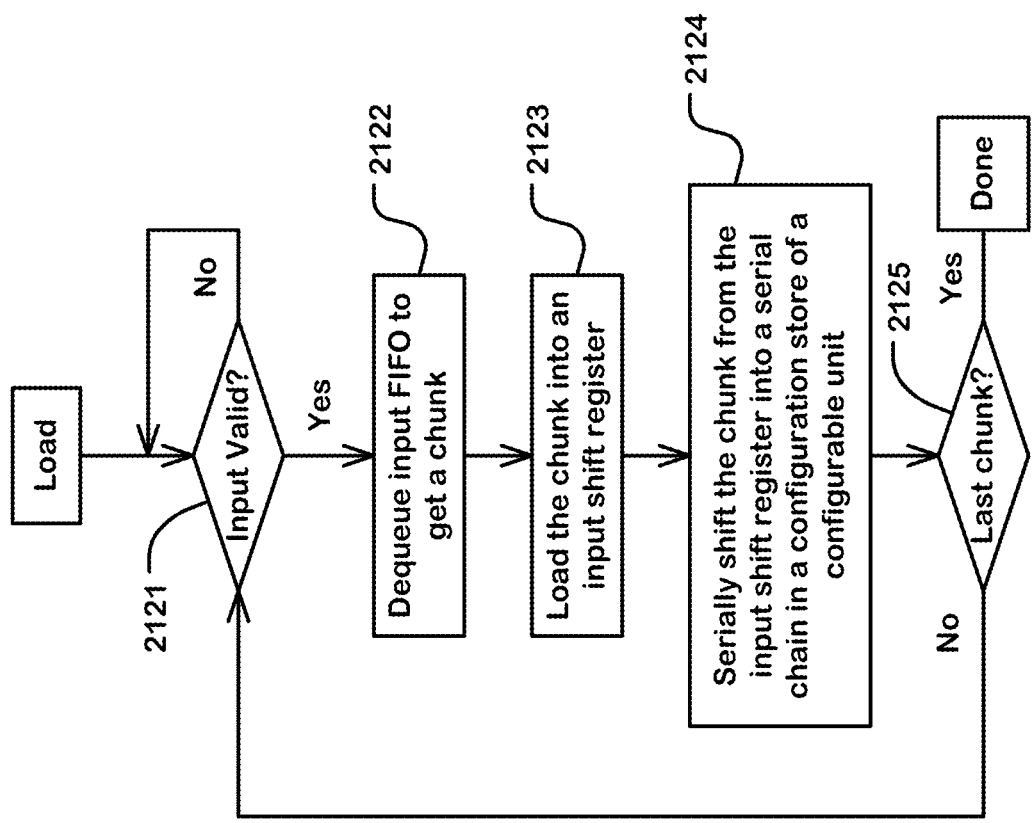
FIG. 21 is a flowchart illustrating a unit configuration load process in a configurable unit.

FIG. 21 is a flowchart illustrating a unit configuration load process in a configurable unit. At Step 2121, a unit configuration load process waits for an input FIFO (610, FIG. 6) to become valid. When valid, the input FIFO has received a chunk of configuration data of the configuration file via the bus system for configuring the configurable unit. When the input FIFO is valid, the flow proceeds to Step 2122.

At Step 2122, the input FIFO is de-queued. At Step 2123, the chunk of configuration data from the input FIFO is loaded in parallel into an input shift register (620, FIG. 6). At Step 2124, a chunk of configuration data in the input shift register is shifted into a configuration serial chain in a configuration data store of the configurable unit.

At Step 2125, the unit configuration load process determines whether the loaded chunk of configuration data is the last chunk of configuration data for the configurable unit. If so, loading of configuration data for the configurable unit is complete. If not, the flow proceeds to Step 2121, and the unit configuration load process waits for the input FIFO to become valid for a next chunk of configuration data. A unit configuration load process in a configurable unit is further described in reference to FIGS. 14 and 15.

Figure 22:
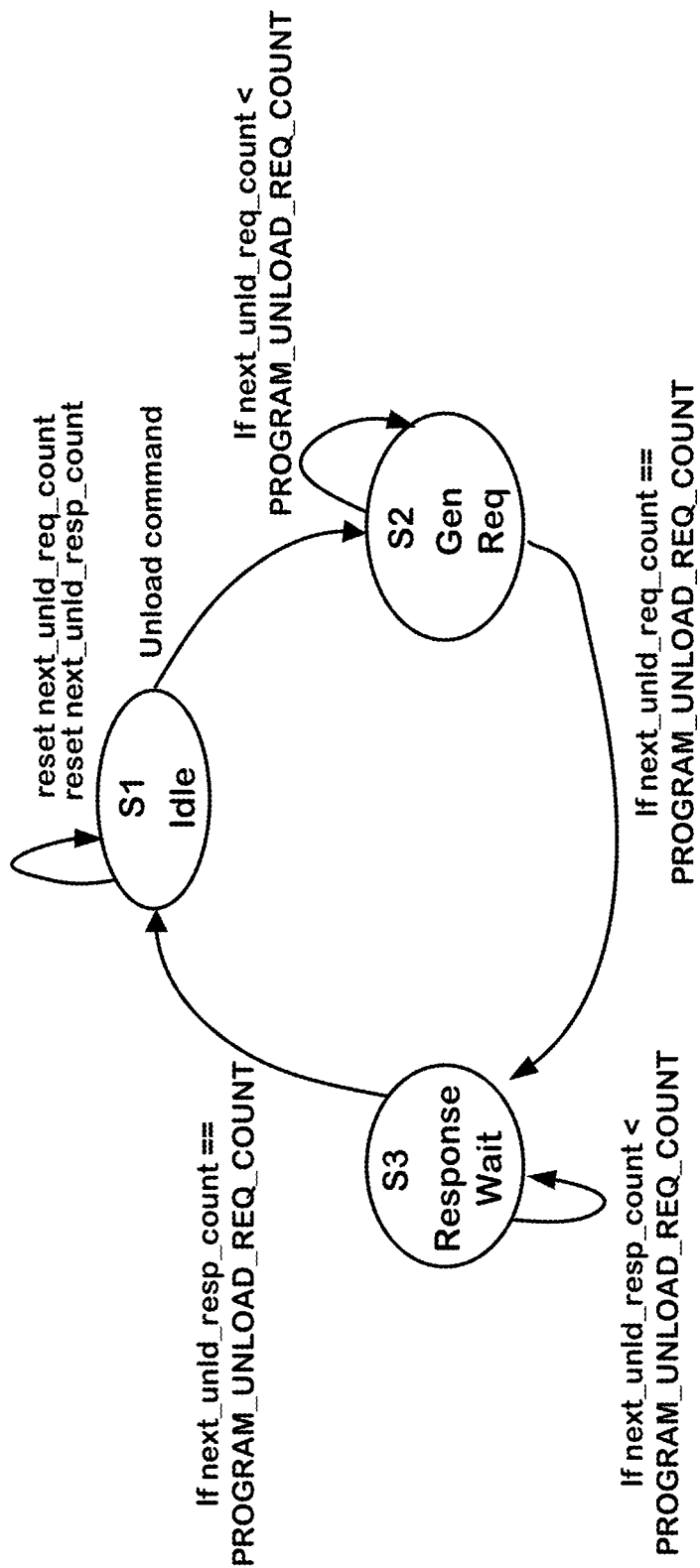
FIG. 22 is a state machine diagram illustrating one example of logic to execute an array configuration unload process for a system like that of FIGS. 2 and 3.

FIG. 22 is a state machine diagram for one example of logic to execute an array configuration unload process.

In this example, the state machine includes three states S1 to S3. At State S1 (Idle), the configuration unload controller waits for a configuration unload command from the host. The configuration unload controller implements two counts "next_unld_req_count" and "next_unld_resp_count" for the array configuration unload process. The count "next_unld_req_count" keeps track of the next unload request count. The count "next_unld_resp_count" keeps track of the next unload response count. At State S1, both counts are reset to an initial value, such as 0. When a configuration unload command is received, the unload process enters State S2.

At State S2 (Gen Req), the configuration unload controller generates unload requests for each of the configurable units in the array of configurable units, including the switch units, the PCUs, the PMUs and the AGCUs in the array. The count "next_unld_req_count" is incremented for each unload request generated. The count "next_unld_req_count" is compared against a predetermined number PROGRAM_UNLOAD_REQ_COUNT, which represents the total number of the configurable units in the array of configurable units. As long as the count "next_unld_req_count" is less than PROGRAM_UNLOAD_REQ_COUNT, the unload process stays in State S2. When the count "next_unld_req_count" is equal to PROGRAM_UNLOAD_REQ_COUNT, the unload requests have been generated for each of the configurable units in the array, and the unload process enters State S3.

At State S3 (Response Wait), the configuration unload controller increments the count "next_unld_resp_count" for each response received from the configurable units in the array. A response includes a chunk (sub-file) in a unit file of configuration data for a configurable unit. A response can also include PMU scratchpad data in some examples. During the unload process, a response is provided to a vector output of a configurable unit and sent on a vector bus to the configuration load controller. As long as the count "next_unld_resp_count" is less than PROGRAM_UNLOAD_REQ_COUNT, the unload process stays in State S3.

At State S3, the unload process generates a memory address for each response received, and inserts each response received along with the memory address generated on the top level network. Each response includes an unload chunk and a sequence ID. A memory address is generated from headers that accompany packets carrying the chunks in the array level network, including a chunk number, a column identifier, a row identifier, and a component identifier in a sequence ID. A component identifier can indicate whether a configurable unit is a switch unit, a PCU unit, a PMU unit or an AGCU unit.

When the count "next_unld_resp_count" is equal to PROGRAM_UNLOAD_REQ_COUNT, the responses have been received from each of the configurable units in the array and inserted on the top level network, and the unload process transitions back to State S1.

In one embodiment, the order for the linear memory address for configuration data in switch units is the first chunks of each row in the first column of switch units, followed by the first chunks of each row in the second column of switch units, followed by the first chunks of each row in the third column of switch units, . . . until the first chunks of each row in the last column. This groups the first chunk of all switch units in linear address space. The first chunks for other types of configurable units are loaded in groups in adjacent address space. Then, the order is followed by the second chunks of each row in the first column of switch units, followed by the second chunks of each row in the second column of switch unites, followed by the second chunks of each row in the third column, . . . until the last chunk in the last row in the last column of switch units, and so on for the second chunks of all the types of configurable units.

Using the order for the memory address for configuration data in switch units as described above, pseudo code below illustrates how to generate a linear memory address for a switch unit (comp_switch). The pseudo code uses 4 inputs:
   comp_id: a component identifier;
   comp_col: a column identifier;
   comp_row: a row identifier;
   comp_chunk: a chunk number;
   and produces an output:
   linear_address: the linear memory address for an unload chunk;
The pseudo code for generating a linear memory address for a particular unload chunk of a switch unit is as follows:
   If(comp_id==comp_switch) begin
      comp_num=comp_col*NUM_ROW_SW+comp_row;
      linear_comp_num=comp_num+
         (comp_chunk*COMP_COUNT_ALL);
      linear_address=linear_comp_num*16;
   end
where
   comp_switch indicates a switch unit;
   NUM_ROW_SW is the number of rows of all switch units;
   COMP_COUNT_ALL is the sum of all configurable units.

To generate a linear memory address for a particular unload chunk of a PCU, PMU, or AGCU unit, similar code can be used. One difference is that the number of rows of all switch units is different than the number of rows of all PCUs, the number of rows of all PMUs, and the number of rows of all AGCUs. Another difference is that the linear memory addresses for the switch units can start at a base address (e.g. 0), while the linear memory addresses for the PCUs, the PMUs and the AGCUs start at an address after the last chunk for the switch units, the PCUs, and the PMUs, respectively.

Figure 23:
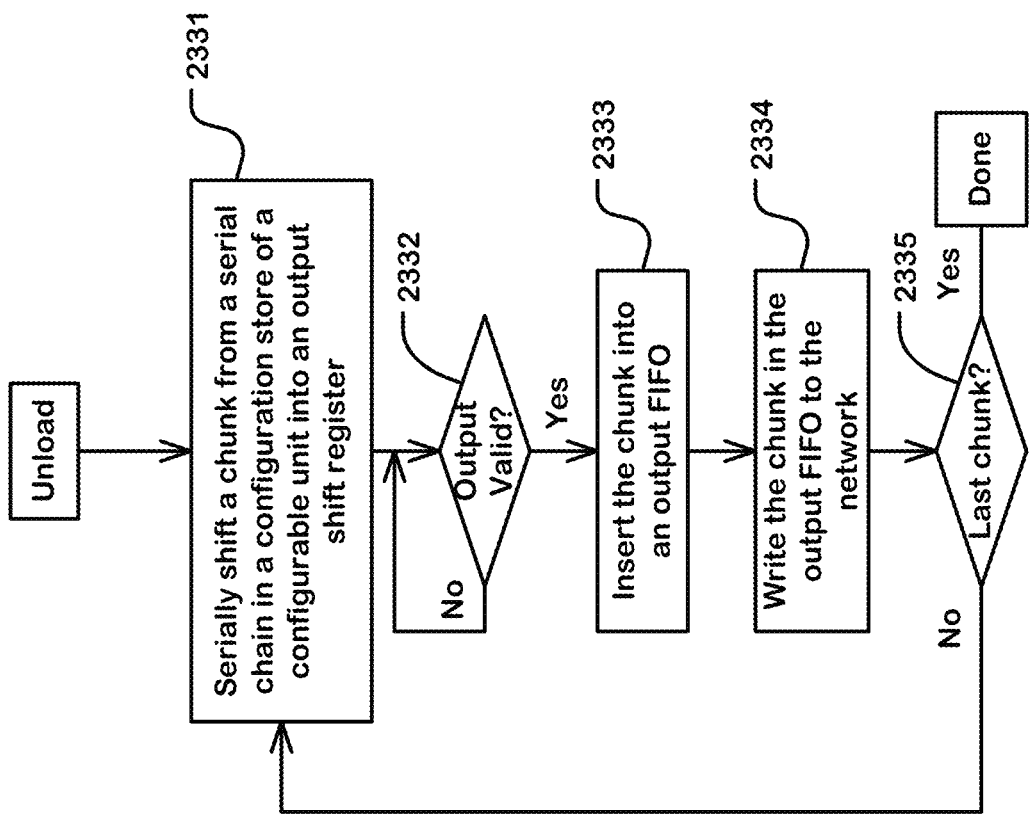
FIG. 23 is a flowchart illustrating a unit configuration unload process in a configurable unit.

FIG. 23 is a flowchart illustrating a unit configuration unload process in a configurable unit. At Step 2331, a chunk of configuration data from the configuration serial chain in the configuration data store is serially shifted into an output shift register (1550, FIG. 15). The flow enters Step 2332.

At Step 2332, the unit configuration unload process waits for an output FIFO (1560, FIG. 15) or other type of output buffer circuit, to become valid. At Step 2333, when the output FIFO becomes valid, the chunk of configuration data from the output shift register is inserted into the output FIFO. At Step 2334, the chunk of configuration data in the output FIFO is written to the bus system.

At Step 2335, the unit configuration unload process determines whether the first chunk of configuration data is the last chunk of configuration data in the configuration data store. If so, unloading of configuration data for the configurable unit is complete. If not, the flow transitions back to Step 2331, and a second chunk of configuration data from the configuration data store is serially shifted into the output shift register. In support of pausing and unloading executing application graphs, the configuration store, such as part of the serial chain or other memory in the unit, can include registers that store state information usable when the application graph is re-loaded and re-started to pick up execution at the point in which it was paused or at checkpoints close to the point in which it was paused.

A technology is provided herein enabling simultaneous execution of multiple, unrelated application graphs in an array of configurable units on one die. This is especially attractive in order to enable sharing the compute capability of the die among a set of smaller application graphs, such as inference or training application graphs used in machine learning based artificial intelligence systems.

Embodiments described here support virtualization at the tile level. In other embodiments, virtualization is supported at the sub-tile level. Technology supporting virtualization comprises one or more of the following mechanisms:
a) Programming switches, and in embodiments tile boundary switches, to ignore inbound traffic, and to drop outbound traffic relative to corresponding tiles or subtiles. This prevents any erroneous or maliciously programmed sets of configurable units to probe into or interfere with other sets.
b) Programming a memory access controller, embodied for example in an AGCU, to check memory addresses of memory bound requests from a given tile or sub-tile set (which are virtual per-tile addresses) within allowed regions, and mapping those regions to physical addresses that are distinct from any other processes sharing the processor. This can be accomplished by base/bounds registers for a set of regions that the tile is allowed to access, and adding an offset to each outbound address to relocate/map the virtual address to a physical address appropriate for that address space.
c) The ability to program each tile independently by loading a configuration bitfile while other tiles are operating. In an example embodiment, a bitfile can be loaded from local or remote memory or from the host via an appropriate link.
d) The ability to unload a tile or sub-tile independently of other tiles or sub-tiles.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A reconfigurable data processor, comprising:
an array of configurable units;
a configurable interface unit including a configuration load controller; and
a bus system connected to the array of configurable units,
wherein the bus system includes a top level network and an array level network,
wherein the top level network is connected to an external data interface for communication with memory outside of the array of configurable units and to the configuration load controller,
wherein the array level network is connected to configurable units in the array of configurable units,
wherein the configurable interface unit including the configuration load controller is connected between the top level network and the array level network.

2. The reconfigurable data processor of claim 1, wherein the configurable interface unit is further configured to comprise a memory access controller connected to the bus system.

3. The reconfigurable data processor of claim 2, wherein the memory access controller includes logic to route data transfers between the top level network and the array level network.

4. The reconfigurable data processor of claim 1, wherein the configuration load controller is configured to read a configuration file from the memory, and to send configuration data in the configuration file to the configurable units in the array of configurable units.

5. The reconfigurable data processor of claim 4, wherein the configuration load controller is further configured to retrieve chunks of the configuration file over the top level network via the external data interface.

6. The reconfigurable data processor of claim 5, wherein the configuration load controller is further configured to retrieve the chunks of the configuration file in ordered rounds.

7. The reconfigurable data processor of claim 4, wherein the configuration load controller is further configured to distribute chunks of the configuration file to the configurable units in the array of configurable units on the array level network.

8. The reconfigurable data processor of claim 7, wherein the configuration load controller is further configured to distribute the chunks of the configuration file in ordered rounds.

9. The reconfigurable data processor of claim 1, wherein one or both of the array level network and the top level network comprise switches.

10. The reconfigurable data processor of claim 1, wherein the reconfigurable data processor is implemented on a single integrated circuit or a single multichip module.

11. A reconfigurable data processor comprising:
an array of configurable units including a configurable interface unit;
an array level network connecting configurable units of the array of configurable units, including the configurable interface unit;
an interface circuit for communication through an external data connection of the reconfigurable data processor; and a top level network, different than the array level network, connected between 4e the configurable interface unit of the array of configurable units and the interface circuit, wherein the configurable interface unit is connected between the top level network and the array level network.

12. The reconfigurable data processor of claim 11, wherein the interface circuit comprises a memory controller and the external data connection comprises a connection to external memory.

13. The reconfigurable data processor of claim 11, wherein the interface circuit comprises bus interface circuitry and the external data connection comprises an industry standard bus.

14. The reconfigurable data processor of claim 11, the configurable interface unit comprising logic to route data transfers between the top level network and the array level network.

15. The reconfigurable data processor of claim 11, wherein the configurable interface unit comprises a configuration load controller, the configuration load controller is further configured to read configuration data from a memory connected to the external data connection and to send the configuration data to the configurable units in the array of configurable units.

16. The reconfigurable data processor of claim 15, wherein the configuration load controller is further configured to retrieve chunks of the configuration data over the top-level network via the interface circuit.

17. The reconfigurable data processor of claim 15, wherein the configuration load controller is further configured to distribute chunks of the configuration data to the configurable units in the array of configurable units over the array level network.

18. The reconfigurable data processor of claim 11, wherein one or both of the array level network and the top level network comprise switches.

19. The reconfigurable data processor of claim 11, wherein the reconfigurable data processor is implemented on a single integrated circuit or a single multichip module.

* * * * *